United States Patent [19]

Okada et al.

[11] Patent Number: 5,349,020

[45] Date of Patent: Sep. 20, 1994

[54] VULCANIZABLE RUBBER COMPOSITION

[75] Inventors: Keiji Okada; Kazuhiko Murata; Tetsuo Tojo, all of Ichihara; Masaaki Kawasaki; Toshimasa Takata, both of Yamaguchi, all of Japan

[73] Assignee: Mitsui Petrochemical Industries, Ltd., Tokyo, Japan

[21] Appl. No.: 26,783

[22] Filed: Mar. 5, 1993

[30] Foreign Application Priority Data

| Mar. 6, 1992 | [JP] | Japan | 4-050007 |
| Mar. 6, 1992 | [JP] | Japan | 4-050008 |
| Mar. 6, 1992 | [JP] | Japan | 4-050009 |
| Apr. 6, 1992 | [JP] | Japan | 4-083990 |
| Apr. 6, 1992 | [JP] | Japan | 4-083991 |

[51] Int. Cl.$^5$ .................. C08L 23/18; C08L 23/16; C08L 7/00; C08L 9/00
[52] U.S. Cl. .................. 525/237; 525/236; 525/232
[58] Field of Search .................. 525/237, 232, 233; 526/336

[56] References Cited

U.S. PATENT DOCUMENTS

| 2,933,480 | 4/1960 | Gresham et al. | 525/331.8 |
| 3,772,410 | 11/1973 | Lal et al. | 525/237 |
| 3,794,696 | 2/1974 | Lal et al. | 525/237 |
| 3,991,262 | 11/1976 | Lal et al. | 526/336 |
| 4,340,705 | 7/1982 | Lal et al. | 526/336 |
| 4,551,503 | 11/1985 | Lal et al. | 526/336 |
| 4,931,526 | 6/1990 | Yoshitake et al. | 526/336 |

FOREIGN PATENT DOCUMENTS

| 0229489 | 7/1987 | European Pat. Off. |
| 0317240 | 5/1989 | European Pat. Off. |
| 0423368 | 4/1991 | European Pat. Off. |
| 3231949 | 10/1991 | Japan |
| 1022279 | 3/1966 | United Kingdom |
| 90/12818 | 11/1990 | World Int. Prop. O. |

OTHER PUBLICATIONS

*JP 1-12007(A) English text abstract –corresponds to EPA 0317240.

*Primary Examiner*—Carman J. Seccuro, Jr.
*Attorney, Agent, or Firm*—Sherman and Shalloway

[57] ABSTRACT

There is provided a composition comprising a higher a-olefin copolymer (1) obtained by copolymerization in the presence of a specific olefin polymerization catalyst of a specific higher α-olefin, a specific α, ω-diene of the formula (I) and a specific non-conjugated diene of the formula (II), and a rubber (2) selected from the group consisting of a diene rubber, an ethylene/a-olefin copolymer, a nitrile rubber and a hydrogenated nitrile rubber. The composition is excellent in workability strength characteristics, weatherability, ozone resistance and dynamic fatigue resistance, as well as excellent in adhesive properties to fiber and in vibration-insulating properties and damping properties.

13 Claims, 1 Drawing Sheet

VULCANIZABLE RUBBER COMPOSITION

FIELD OF THE INVENTION

This invention relates to vulcanizable rubber compositions excellent in strength characteristics, weatherability, ozone resistance and dynamic fatigue resistance (flexual fatigue resistance) and adhesive properties.

BACKGROUND OF THE INVENTION

Diene rubbers such as natural rubber, isoprene rubber, SBR or BR have wide applications in tires, automotive parts and industrial parts, because of excellent characteristics such as workability, strength and the like. These diene rubbers, however, are poor in weatherability and ozone resistance, and also do not have sufficient damping properties and vibration-insulating properties, and hence further improvements have been desired from the viewpoint of the practical use.

Ethylene/α-olefin copolymers represented by ethylene/propylene/diene copolymers have wide applications in automotive parts, industrial rubber parts, electrical insulating materials, and materials for civil engineering and construction. The ethylene/α-olefin copolymers, however, are poor in damping properties, vibration-insulating properties and dynamic fatigue resistance (flexual fatigue resistance), and hence there is room for further improvement in specific applications such as rubber vibration insulators, rubber rolls, belts and tires.

Further, nitrile rubbers and hydrogenated nitrile rubbers have also wide applications such as sealants, hoses and belts because of being excellent in characteristics such as strength and oil resistance. The nitrile rubbers and hydrogenated nitrile rubbers, however, are poor in weatherability, ozone resistance, low temperature characteristics and dynamic fatigue resistance, and hence further improvement in these characteristics is desired.

U.S. Pat. No. 4,645,793 discloses a blend of a diene rubber and an ethylene/α-olefin copolymer rubber having improved weatherability and ozone resistance. However, drawbacks to such a blend include decrease in dynamic fatigue resistance (flexual fatigue resistance) and lowering in adhesive power to fiber.

Further, Journal of the Japan Rubber Association, 49, 236, 241, 246 (1976) discloses a blend of an ethylene/α-olefin copolymer rubber having improved weatherability and ozone resistance. However, such a blend has also drawbacks including decrease in dynamic fatigue resistance (flexual fatigue resistance) and lowering in adhesive power to fiber.

Therefore, there has long been desired vulcanizable rubber compositions excellent in workability, strength characteristics, weatherability, ozone resistance and dynamic fatigue resistance, as well as excellent in vibration-insulating properties, damping properties and adhesive properties to fiber.

The present inventors have found that the above-mentioned drawbacks can be solved by a composition comprising a higher α-olefin copolymer (1) obtained by copolymerization in the presence of a specific olefin polymerization catalyst of a specific higher α-olefin, a specific α, ω-diene and a specific non-conjugated diene, and a rubber (2) selected from the group consisting of a diene rubber, an ethylene/α-olefin copolymer, a nitrile rubber and a hydrogenated nitrile rubber.

OBJECT OF THE INVENTION

Accordingly, an object of the invention is to provide vulcanizable rubber compositions excellent in workability, strength characteristics, weatherability, ozone resistance and dynamic fatigue resistance, as well as excellent in adhesive properties to fiber and in vibration-insulating properties and damping properties.

SUMMARY OF THE INVENTION

According to the present invention, there is provided a vulcanizable rubber composition of the present invention comprising:

a higher α-olefin copolymer (1) consisting of a higher α-olefin having 6–20 carbon atoms, and an α, ω-diene represented by the following general formula (I)

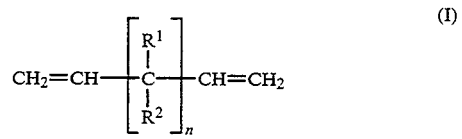

wherein n is an integer of 1–3, and $R^1$ and $R^2$ each represent independently a hydrogen atom or an alkyl group of 1–8 carbon atoms, and a non-conjugated diene represented by the following general formula (II)

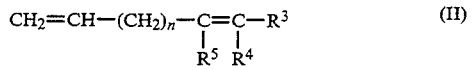

wherein n is an integer of 1–5, $R^3$ represents an alkyl of 1–4 carbon atoms, and $R^4$ and $R^5$ each represent hydrogen atom or an alkyl of 1–8 carbon atoms, provided that both $R^4$ and $R^5$ are not hydrogen atoms simultaneously, and at least one rubber (2) selected from the group consisting of a diene rubber, an ethylene/α-olefin copolymer, a nitrile rubber and a hydrogenated nitrile rubber, which composition has a weight ratio ((1)/(2)) of said higher α-olefin copolymer (1) to said diene rubber (2) in the range of from 5/95 to 95/5.

The vulcanizable rubber composition of the invention which contains a diene rubber as the rubber (2), is particularly useful for rubber compositions for a tire sidewall or a tire tread.

When the rubber composition of the invention is used for the tire sidewall, the weight ratio of the higher α-olefin copolymer (1) to the diene rubber (2) is preferably in the range of from 5/95 to 50/50, and when it is used for the tire tread, the weight ratio of the higher α-olefin copolymer (1) to the diene rubber (2) is preferably in the range of from 5 1/99 to 50/50.

DETAILED DESCRIPTION OF THE INVENTION

Figure 1:
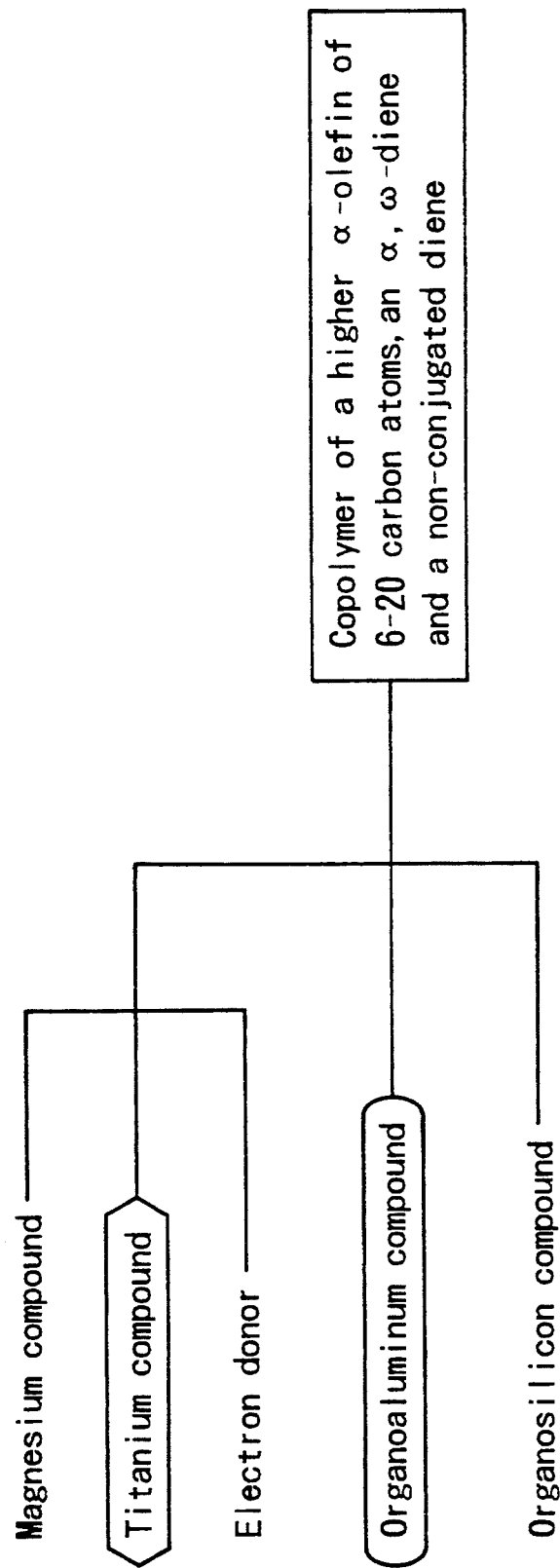
FIG. 1 is an illustration of the preparation of a catalyst for olefin polymerization which may be used for preparing the higher α-olefin copolymer of the invention.

The vulcanizable rubber composition of the present invention is illustrated below in detail.

The vulcanizable rubber composition of the invention comprises the higher α-olefin copolymer (1) and at least one rubber (2) selected from the group consisting of a diene rubber, an ethylene/α-olefin copolymer, a nitrile rubber and a hydrogenated nitrile rubber.

Higher α-olefin copolymer (1)

The higher α-olefin copolymer used in the invention is a copolymer of a higher olefin of 6-20 carbon atoms, an α, ω-diene represented by the above-mentioned general formula (I) and a non-conjugated diene represented by the above-mentioned general formula (II).

Higher α-olefin

The higher α-olefin used in the invention has 6-20 carbon atoms. Concrete examples of the higher α-olefin include hexene-1, heptene-1, octene-1, nonene-1, decene-1, undecene-1, dodecene-1, tridecene-1, tetradecene-1, pentadecene-1, hexadecene-1, heptadecene-1, nonadecene-1, eicosene-1, 9-methyldecene-1, 11-methyldecene-1 and 12-ethyltetradecene-1.

In the invention, these higher α-olefins may be used alone or in combination of two or more kinds. Of these higher α-olefins, particularly preferably used are hexene-1, octene-1 and decene-1.

α, ω-olefin

The α, ω-diene employable in the invention is represented by the following formula (I).

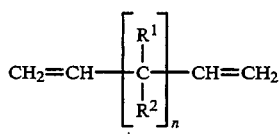

In the above formula (I), n is an integer of 1 to 3, $R^1$ and $R^2$ are each independently a hydrogen atom or an alkyl group having 1 to 8 carbon atoms.

Concrete examples of the α, ω-diene include 1,4-pentadiene, 1,5-hexadiene, 1,6-heptadiene, 3-methyl-1,4-pentadiene, 3-methyl-1,5-hexadiene, 3-methyl-1,6-heptadiene, 4-methyl-1,6-heptadiene, 3,3-dimethyl-1,4-pentadiene, 3,4-dimethyl-1,5-hexadiene, 4,4-dimethyl-1,6-heptadiene and 4-methyl-1,6-heptadiene.

When the (α, ω-diene of the formula (I) where each of $R^1$ and $R^2$ is hydrogen is used, it is presumed that the recurring units derived from the α, ω-diene Formula (I) exist in the higher α-olefin copolymer of the invention in the form represented by the following formulae (III) and/or (IV).

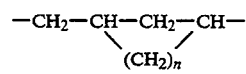

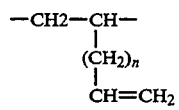

In the Formula (III) and the Formula (IV) the letter n has the same meaning as in the Formula (I).

In the higher α-olefin copolymer of the invention, these recurring units are arranged at random to form a substantially linear structure. The structure of these recurring units can be confirmed by means of $^{13}$C-NMR. By the expression "a substantially linear structure" used herein is meant that the substantially linear structure may contain a branched chain structure but does not contain a crosslinked network structure. It can be confirmed that the higher α-olefin copolymer of the invention has a substantially linear structure by the fact that this copolymer is completely dissolved in decalin at 135° C. and contains no crosslinked copolymer in gel form.

Non-conjugated diene

The non-conjugated diene employable in the invention is represented by the following formula (II).

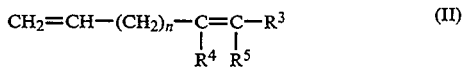

In the above formula (II), n in an integer of 1 to 5, $R^3$ is an alkyl group having 1 to 4 carbon atoms, and $R^4$ and $R^5$ are each independently a hydrogen atom or an alkyl group having 1 to 8 carbon atoms, provided that both of $R^4$ and $R^5$ are not hydrogen atoms simultaneously.

Concrete examples of the non-conjugated diene include 4-methyl-1,4-hexadiene, 5-methyl-1,4-hexadiene, 4-ethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 7-methyl-1,6-decadiene, 6ethyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene and 9-methyl-1,8-undecadiene.

In the invention, these non-conjugated dienes may be used alone or in combination thereof.

In addition to the above non-conjugated dienes, other copolymerizable monomers such as ethylene, propylene, butene-1 and 4-methylpentene-1 may be used with the proviso that the objects of the present invention are not marred.

A molar ratio of constituent units derived from the higher α-olefin to constituent units derived from the α, ω-diene (higher α-olefin/α, ω-diene) in the higher α-olefin copolymer of the invention, is within the range of 50/50 to 95/5, preferably 60/40 to 90/10, more preferably 65/35 to 90/10. The values of the molar ratio are those determined by means of a $^{13}$C-NMR.

According to the present invention, the higher α-olefin is copolymerized with the α, ω-diene to improve processability of the resultant higher α-olefin copolymer.

The content of the non-conjugated diene in the higher α-olefin copolymer of the invention is in the range of 0.01 to 30 mol %, preferably 0.1 to 20 mol %, particularly preferably 0.1 to 10 mol %. The iodine value of the higher α-olefin copolymer is in the range of 1 to 50, preferably 2 to 30. This property value is a measure of vulcanization of the higher α-olefin copolymer of the invention using sulfur or a peroxide.

The higher α-olefin copolymer of the invention has an intrinsic viscosity (η), as measured in decalin at 135° C., of 1.0 to 10.0 dl/g, preferably 1.5 to 7 dl/g. This property value is a measure of molecular weight of the higher α-olefin copolymer of the invention, and is useful in combination with other property values to obtain a copolymer of excellent properties such as weathering resistance, ozone resistance, thermal aging resistance, low-temperature characteristics and dynamic fatigue resistance.

The vulcanizable rubber composition of the present invention is improved in weathering resistance and ozone resistance without sacrificing other excellent properties such as dynamic fatigue resistance and adhesion property. The reason therefor is considered that the higher α-olefin copolymer (1) mentioned above is a saturated hydrocarbon rubber and has a high affinity for and compatibility with various composite materials.

The higher α-olefin copolymer of the invention can be prepared by the following process.

The higher α-olefin copolymer of the invention can be obtained by copolymerizing the higher α-olefin, α, ω-diene of the formula (I) and non-conjugated diene of the formula (II) in the presence of a catalyst for olefin polymerization.

The catalyst for olefin polymerization employable in the invention comprises a solid titanium catalyst component (A-1), an organometallic compound catalyst component (B) and an electron donor catalyst component (C).

FIG. 1 illustrates the steps for the preparation of the catalyst for olefin polymerization employable for preparing the higher α-olefin copolymer of the invention.

The solid titanium catalyst component (A-1) used in the invention is a highly active catalyst component containing magnesium, titanium, halogen and, if desired, an electron donor as essential components.

The solid titanium catalyst component (A-1) can be prepared by using for example a titanium compound, a magnesium compound and, if desired, an electron donor, and bringing them into contact with each other.

Examples of the titanium compounds employable for preparing the solid titanium catalyst component (A-1) include tetravalent titanium compounds and trivalent titanium compounds.

As the tetravalent titanium compounds, there can be mentioned compounds represented by the following formula:

$$Ti(OR)_gX_{4-g}$$

wherein R is a hydrocarbon group, X is a halogen atom, and g is a number satisfying the condition of $0 < g < 4$.

Concrete examples of such compounds are described below.

Titanium tetrahalides such as $TiCl_4$, $TiBr_4$ and $TiI_4$
Alkoxytitanium trihalides such as:
  $Ti(OCH_3)Cl_3$,
  $Ti(OC_2H_5)Cl_3$,
  $Ti(On-C_4H_9)Cl_3$,
  $TI(OC_2H_5)Br_3$, and
  $TI(O-iso-C_4H_9)Br_3$
Dialkoxytitanium dihalides such as:
  $Ti(OCH_3)_2Cl_2$,
  $Ti(OC_2H_5)_2Cl_2$,
  $Ti(On-C_4H_9)_2Cl_2$, and
  $Ti(OC_2H_5)_2Br_2$
Trialkoxytitanium monohalides such as:
  $Ti(OCH_3)_3Cl$,
  $Ti(OC_2H_5)_3Cl$,
  $Ti(On-C_4H_9)_3Cl$, and
  $Ti(OC_2H_5)_3Br$
Tetraalkoxytitaniums such as:
  $Ti(OCH_3)_4$,
  $Ti(OC_2H_5)_4$,
  $Ti(On-C_4H_9)_4$,
  $Ti(O-iso-C_4H_9)_4$, and
  $Ti(O-2-ethylhexyl)_4$ Of these, preferred are titanium tetrahalides, and particularly preferred is titanium tetrachloride. These titanium compounds may be used alone or in combination. Further, they can be used after diluting them in hydrocarbons or halogenated hydrocarbons.

As the trivalent titanium compound, titanium trichloride is employed.

Preferably used titanium trichloride is that obtained by bringing titanium tetrachloride into contact with hydrogen, a metal (e.g., magnesium metal, aluminum metal and titanium metal) or an organometallic compound (e.g., organomagnesium compound, organoaluminum compound and organozinc compound) so as to be reduced.

The magnesium compounds employable for preparing the solid titanium catalyst component (A-1) may or may not have reducing ability.

An example of the magnesium compounds having reducing ability is a compound represented by the following formula:

$$X_nMgR_{2-n}$$

wherein n is a number satisfying the condition of $0 \leq n < 2$; R is hydrogen, an alkyl group of 1–20 carbon atoms, an aryl group or a cycloalkyl group; when n is 0, two of R may be the same or different from each other; and X is halogen.

Concrete examples of the organomagnesium compounds having reducing ability include:
dialkylmagnesium compounds such as dimethylmagnesium, diethylmagnesium, dipropylmagnesium, dibutylmagnesium, diamylmagnesium, dihexylmagnesium, didecylmagnesium, octylbutylmagnesium and ethylbutylmagnesium;
alkylmagnesium halides such as ethylmagnesium chloride, propylmagnesium chloride, butylmagnesium chloride, hexylmagnesium chloride and amylmagnesium chloride;
alkylmagnesium alkoxides such as butylethoxymagnesium, ethylbutoxymagnesium and octylbutoxymagnesium; and
butylmagnesium hydride.

Concrete examples of the magnesium compounds not having reducing ability include:
magnesium halides such as magnesium chloride, magnesium bromide, magnesium iodide and magnesium fluoride;
alkoxymagnesium halides such as methoxymagnesium chloride, ethoxymagnesium chloride, isopropoxymagnesium chloride, butoxymagnesium chloride and octoxymagnesium chloride;

aryloxymagnesium halides such as phenoxymagnesium chloride and methylphenoxymagnesium chloride;

alkoxymagnesiums such as ethoxymagnesium, isopropoxymagnesium, butoxymagnesium, n-octoxymagnesium and 2-ethylhexoxymagnesium;

aryloxymagnesiums such as phenoxymagnesium and dimethylphenoxymagnesium; and carboxylic acid salts of magnesium such as magnesium laurate and magnesium stearate.

The above-mentioned magnesium compounds not having reducing ability may be compounds derived from the aforementioned magnesium compounds having reducing ability or compounds derived during the preparation of the catalyst components. In order to derive the magnesium compounds not having reducing ability from the magnesium compounds having reducing ability, for example, the magnesium compounds having reducing ability are brought into contact with polysiloxane compounds, halogen-containing silane compounds, halogen-containing aluminum compounds, esters, alcohols, halogen-containing compounds or compounds having an OH group or an active carbon-oxygen bond.

The above-mentioned magnesium compounds having or not having reducing ability may form the later-described organometallic compounds such as complex compounds with other metals (e.g., aluminum, zinc, boron, beryllium, sodium and potassium) and complex compounds therewith, or may be in the form of a mixture with other metal compound. Further, the magnesium compounds may be used singly or in combination of two or more kinds of the above-mentioned compounds. Moreover, the magnesium compounds may be used either in the liquid form or in the solid form. When the used magnesium compound is solid, the compound can be changed to liquid state using alcohols, carboxylic acids, aldehydes, amines, metallic acid esters, etc. which are described later as electron donors.

Other various magnesium compounds than the above-mentioned ones can be also employed for preparing the solid titanium catalyst component (A-1), but preferred are those in the form of halogen-containing magnesium compounds in the finally obtained solid titanium catalyst component (A-1). Accordingly, if a magnesium compound not containing halogen is used, the compound is preferably brought into contact with a halogen-containing compound to be reacted therewith on the way to prepare the solid titanium catalyst component.

Among the above-mentioned various magnesium compounds, preferred are magnesium compounds not having reducing ability, and of these, magnesium chloride, alkoxymagnesium chloride and aryloxymagnesium chloride are particularly preferred.

In the preparation of the solid titanium catalyst component (A-1), it is preferred to use an electron donor.

Examples of the electron donors include:

oxygen-containing electron donors such as alcohols, phenols, ketones, aldehydes, carboxylic acids, organic acid halides, esters of organic or inorganic acids, ethers, diethers, acid amides, acid anhydrides and alkoxysilane; and nitrogen-containing electron donors such as ammonias, amines, nitriles, pyridines and isocyanates.

In more concrete, there can be mentioned for example:

alcohols of 1-18 carbon atoms such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol and isopropylbenzyl alcohol; halogen-containing alcohols of 1-18 carbon atoms such as trichloromethanol, trichloroethanol and trichlorohexanol;

phenols of 6-20 carbon atoms which may have a lower alkyl group such as phenol, cresol, xylenol, ethyl phenol, propyl phenol, nonyl phenol, cumyl phenol and naphthol;

ketones of 3-15 carbon atoms such as acetone, methyl ethyl ketone, methyl isobutyl ketone, acetophenone, benzophenone and benzoquinone;

aldehydes of 2-15 carbon atoms such as acetaldehyde, propionaldehyde, octylaldehyde, benzaldehyde, tolualdehyde and naphthaldedehyde;

organic acid esters of 2-18 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, γ-butyrolactone, δ-valerolactone, cumarine, phthalide and ethyl carbonate;

acid halides of 2-15 carbon atoms such as acetyl chloride, benzoyl chloride, toluic acid chloride and anisic acid chloride;

ethers of 2-20 carbon atoms such as methyl ether, ethyl ether, isopropyl ether, butyl ether, amyl ether, tetrahydrofuran, anisole and diphenyl ether;

acid amides such as N,N-dimethylacetamide, N,N-dimethylbenzamide and N,N-dimethyltoluamide;

amines such as trimethylamine, triethylamine, tributylamine, tribenzylamine and tetramethylethylenediamine;

nitriles such as acetonitrile, benzonitrile and trinitrile;

pyridines such as pyridine, methyl pyridine, ethyl pyridine and dimethyl pyridine; and acid anhydrides such as acetic anhydride, phthalic anhydride and benzoic anhydride.

Preferred examples of the organic acid esters are polycarboxylates having skeleton of the following formula.

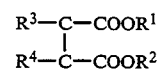

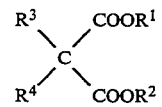

or

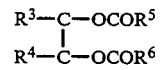

In the above formulas, $R^1$ is a substituted or unsubstituted hydrocarbon group; each of $R^2$, $R^5$ and $R^6$ is hydrogen or a substituted or unsubstituted hydrocarbon group; and each of $R^3$ and $R^4$ is hydrogen or a substituted or unsubstituted hydrocarbon group, preferably at least one of them being a substituted or unsubstituted hydrocarbon group. $R^3$ and $R^4$ may be bonded to each other to form a cyclic structure. When the hydrocarbon groups $R^1$ to $R^6$ are substituted, the substituted groups contain different atoms such as N, O and S, and have groups such as C—O—C, COOR, COOH, OH, $SO_3H$, —C—N—C— and $NH_2$.

Concrete examples of the polycarboxylates include:
aliphatic polycarboxylates,
alicyclic polycarboxylates,
aromatic polycarboxylates, and
heterocyclic polycarboxylates.

Preferred examples of the polycarboxylates are n-butyl maleate, diisobutyl methylmaleate, di-n-hexyl cyclohexenecarboxylate, diethyl nadiate, diisopropyl tetrahydrophthalate, diethyl phthalate, diisobutyl phthalate, di-n-butyl phthalate, di-2-ethylhexyl phthalate and dibutyl 3,4 - furandicarboxylate.

Particularly preferred examples of the polycarboxylates are phthalates.

As the diether compounds, there can be mentioned compounds represented by the following formula:

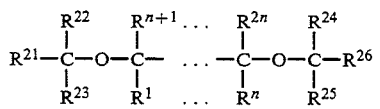

wherein n is an integer satisfying the condition of $2 \leq n \leq 10$; $R^1$ to $R^{26}$ are substituent groups having at least one element selected from carbon, hydrogen, oxygen, halogen, nitrogen, sulfur, phosphorus, boron and silicon; any optional combination of from $R^1$ to $R^{26}$ preferably $R^1$ to $R^{2n}$, may form in corporation a ring other than a benzene ring; and an atom other than a carbon atom may be contained in the main chain.

Preferred examples thereof are:
2,2-diisobutyl-1,3-dimethoxypropane,
2-isopropyl-2-isopentyl-1,3-dimethoxypropane,
2,2-dicyclohexyl-1,3-dimethoxypropane, and
2,2-bis(cyclohexylmethyl)-1,3-dimethoxypropane.

The above-mentioned electron donors may be used in combination of two or more kinds.

In the preparation of the solid titanium catalyst component (A-1) employable in the invention, the above-mentioned mentioned various compounds may be brought into contact with organic or inorganic compounds containing silicon, phosphorus, aluminum, etc. which are conventionally used as carrier compounds and reaction assistants.

Useful carrier compounds are $Al_2O_3$, $SiO_2$, $B_2O_3$, MgO, CaO, $TiO_2$, ZnO, $SnO_2$, BaO, ThO and a resin such as a styrene/divinylbenzene copolymer. Of these, preferred are $Al_2O_3$, $SiO_2$ and a styrene/divinylbenzene copolymer.

The solid titanium catalyst component (A-1) employable in the invention is prepared by bringing the aforementioned titanium compound and magnesium compound (and preferably further the above-mentioned electron donor) into contact with each other.

There is no specific limitation on a process for preparing the solid titanium catalyst component (A-1) using those compounds. Examples of the processes using a tetravalent titanium compound are briefly described below.

(1) A process comprising bringing a solution consisting of a magnesium compound, an electron donor and a hydrocarbon solvent into contact with an organometallic compound, after or simultaneously with precipitating a solid by bringing the solution into contact with a titanium compound.

(2) A process comprising bringing a complex composed of a magnesium compound and an electron donor into contact with an organometallic compound, and then bringing the reaction product into contact with a titanium compound.

(3) A process comprising bringing a product obtained by the contact of an inorganic carrier and an organic magnesium compound into contact with a titanium compound. In this case, the above product may be beforehand brought into contact with a halogen-containing compound, an electron donor and/or an organometallic compound.

(4) A process comprising obtaining an inorganic or organic carrier on which a magnesium compound is supported from a mixture of an inorganic or organic carrier and a solution containing a magnesium compound and an electron donor (and further a hydrogen solvent in some cases), and then bringing the obtained carrier into contact with a titanium compound.

(5) A process comprising bringing a solution containing a magnesium compound, a titanium compound and an electron donor (and further a hydrogen solvent in some cases) into contact with an inorganic or organic carrier to obtain a solid titanium catalyst component (A-1) on which magnesium and titanium are supported.

(6) A process comprising bringing a liquid organic magnesium compound into contact with a halogen-containing titanium compound.

(7) A process comprising bringing a liquid organic magnesium compound into contact with a halogen-containing compound, and then bringing the product thus obtained into contact with a titanium compound.

(8) A process comprising bringing an alkoxy group-containing magnesium compound into contact with a halogen-containing titanium compound.

(9) A process comprising bringing a complex composed of an alkoxy group-containing magnesium compound and an electron donor into contact with a titanium compound.

(10) A process comprising bringing a complex composed of an alkoxy group-containing magnesium compound and an electron donor into contact with an organometallic compound, and then bringing the product thus obtained into contact with a titanium compound.

(11) A process comprising bringing a magnesium compound, an electron donor and a titanium compound into contact with each other in an optional order. In this reaction, each components may be pretreated with an electron donor and/or a reaction assistant such as an organometallic compound or a halogen-containing silicon compound.

(12) A process comprising bringing a liquid magnesium compound not having reducing ability into contact with a liquid titanium compound, if necessary in the presence of an electron donor, to precipitate a solid magnesium/titanium complex compound.

(13) A process comprising further bringing the reaction product obtained in the above process (12) into contact with an titanium compound.

(14) A process comprising further bringing the reaction product obtained in the above process (11) or (12) into contact with an electron donor and a titanium compound.

(15) A process comprising pulverizing a magnesium compound and a titanium compound (and, if necessary, an electron donor) to obtain a solid product, and treating the solid product with either halogen, a halogen compound or aromatic hydrocarbon. This process may include a step of pulverizing only a magnesium compound, a step of pulverizing a complex compound composed of a magnesium compound and an electron donor, or a step of pulverizing a magnesium compound and a titanium compound. Further, after the pulverization, the solid product may be subjected to a pretreatment with a reaction assistant and then subjected to a treatment with halogen or the like. Examples of the reaction assistants include an organometallic compound and a halogen-containing silicon compound.

(16) A process comprising pulverizing a magnesium compound, and then bringing the pulverized magnesium compound into contact with a titanium compound. In this case, an electron donor or a reaction assistant may be used in the pulverization stage and/or the contacting stage.

(17) A process comprising treating the compound obtained in any of the above processes (11) to (16) with halogen, a halogen compound or aromatic hydrocarbon.

(18) A process comprising bringing the reaction product obtained by the contact of a metal oxide, an organic magnesium compound and a halogen-containing compound into contact with a titanium compound and if necessary an electron donor.

(19) A process comprising bringing a magnesium compound such as a magnesium salt of organic acid, alkoxymagnesium or aryloxymagnesium into contact with a titanium compound and/or halogen-containing hydrocarbon and, if necessary, an electron donor.

(20) A process comprising bringing a hydrocarbon solution containing at least a magnesium compound and alkoxytitanium into contact with a titanium compound and/or an electron donor. In this case, a halogen-containing compound such as a halogen-containing silicon compound may be further brought into contact therewith, if necessary.

(21) A process comprising bringing a liquid magnesium compound not having reducing ability into contact with an organometallic compound so as to precipitate a solid magnesium/metal (aluminum) complex compound, and then bringing the solid double compound into contact with a titanium compound and, if necessary, an electron donor.

Preparation of the solid titanium catalyst component (A-1) is generally carried out at a temperature of −70° to 200° C., preferably −50° to 150° C.

The solid titanium catalyst component (A-1) thus obtained contains titanium, magnesium and halogen, and preferably further contains an electron donor in addition thereto.

In the solid titanium catalyst component (A-1), a ratio of halogen/titanium (atomic ratio) is 2–200, preferably 4–90, and a ratio of magnesium/titanium (atomic ratio) is 1–100, preferably 2–50.

The electron donor is contained generally in the electron donor/titanium ratio (molar ratio) of 0.01 to 100, preferably 0.05 to 50.

As for the solid titanium catalyst component (A-1), examples using a titanium compound are described in the invention, but the titanium used in the above compounds can be replaced with zirconium, hafnium, vanadium, niobium, tantalum or chromium.

Processes for preparing the titanium trichloride catalyst component (A-1) are described in detail, for example, in Japanese Laid-open Publications No. 50(1975)-108385, No. 50(1975)-126590, No. 51(1976)-20297, No. 51(1976) -28189, No. 51(1976)-64586, No. 51(1976)-92885, No. 51(1976) -136625, No. 52(1977) -87489, No. 52(1977) -100596, No. 52(1977) -147688, No. 52(1977) -104593, No. 53 (1978) -2580, No. 53(1978) -40093, No. 53(1978) -40094, No. 53(1978)-43094, No. 55(1980) -135102, No. 55(1980) -135103, No. 55(1980)-152710, No. 56(1981) -811, No. 56(1981) -11908, No. 56(1981)-18606, No. 58(1983)-83006, No. 58(1983)-138705, No. 58(1983)-138706, No. 58(1983)-138707, No. 58(1983)-138708, No. 58(1983) -138709, No. 58(1983) -138710, No. 58(1983) -138715, No. 60(1985) -23404, No. 61(1986) -21109, No. 61(1986)-37802 and No. 61(1986) -37803.

In the invention, a titanium trichloride catalyst component (A-2) which is conventionally known can be also employed as other example of the solid titanium catalyst component exemplified as the transition metal compound catalyst component (A).

Processes for preparing the titanium trichloride catalyst component (A-2) are described in detail, for example, in Japanese Patent Laid-open Publications No. 63(1988) -17274, No. 64(1989)-38409, No. 56(1981) -34711, No. 61(1986) -287904, No. 63(1988) -75007, No. 63(1988) -83106, No. 59(1984) -13630, No. 63(1988) -108008, No. 63(1988) -27508, No. 57(1982) -70110, No. 58(1983) -219207, No. 1 (1989) -144405 and No. 1(1989)-292011.

An example of the titanium trichloride catalyst component (A-2) is the aforementioned titanium trichloride. The titanium trichloride can be used together with the aforementioned electron donor and/or tetravalent titanium compound, or can be used after those components are brought into contact with each other.

Next, the organometallic compound catalyst component (B) containing a metal selected from metals in Group I to Group III of a periodic table which is used for preparing the α-olefin/polyene copolymer-containing polymer (I) will be described.

As the organometallic compound catalyst component (B), there can be employed for example an organoaluminum compound (B-1), an alkyl complex compound composed of a metal in Group I of a periodic table and aluminum, an organometallic compound of a metal in Group II of a periodic table.

The organoaluminum compound (B-1) is, for example, the organoaluminum compound represented by the formula:

$R^a{}_n AlX_{3-n}$ wherein $R^a$ is hydrocarbon of 1-12 carbon atoms, X is halogen or hydrogen, and n is 1-3.

In the above-mentioned formula, $R^a$ is hydrocarbon group of 1-12 carbon atoms, such as, alkyl, cycloalkyl or aryl, including concretely methyl, ethyl, n-propyl, isopropyl, isobutyl, pentyl, hexyl, octyl, cyclopentyl, cyclohexyl, phenyl, tolyl, etc.

The organoaluminum compounds include, in concrete, such compounds as mentioned below.

Trialkylaluminum such as trimethylaluminum, triethylaluminum, triisopropylaluminum, triisobutylaluminum, trioctylaluminum, tri-2-ethylhexylaluminum, etc;

alkenylaluminum such as isoprenylaluminum, etc;

dialkylaluminum halides such as dimethylaluminum chloride, diethylaluminum chloride, diisopropylaluminum chloride, diisobutylaluminum chloride, dimethylaluminum bromide, etc;

alkylaluminum sesquihalides such as methylaluminum sesquichloride, ethylaluminum sesquichloride, isopropylaluminum sesquichloride, butylaluminum sesquichloride, ethylaluminum sesquibromide, etc;

alkylaluminum dihalides such as methylaluminum dichloride, ethylaluminum dichloride, isopropylaluminum dichloride, ethylaluminum dibromide, etc, and alkylaluminum hydride such as diethylaluminum hydride and diisobutylaluminum hydride.

As the organoaluminum compounds (B-1), there may also be used a compound represented by the following formula:

$$R^a{}_nAlY_{3-n}$$

wherein $R^a$ is as defined above,

Y is $-OR^b$, $-OSiR^c{}_3$, $-OAlR^d{}_2$, $-NR^e{}_2$, $-SiR^f{}_3$, or $-N(R^g)AlR^h{}_2$, n is 1-2 and $R^b$, $R^c$, $R^d$ and $R^h$ are each methyl, ethyl, isopropyl, isobutyl, cyclohexyl, phenyl, etc;

$R^e$ is hydrogen, methyl, ethyl, isopropyl, phenyl, trimethylsilyl, etc; and $R^f$ and $R^g$ are each methyl, ethyl, etc.

The organoaluminum compounds (B-1) include, in concrete, such compounds as mentioned below.

(i) Compounds of the formula $R^a{}_nAl(OR^b)_{3-n}$ such as dimethylaluminum methoxide, diethylaluminum ethoxide, diisobutylaluminum methoxide, etc;

(ii) Compounds of the formula $R^a{}_nAl(OSiR^c{}_3)_{3-n}$ such as Et$_2$Al(OSiMe$_3$), (iso-Bu)$_2$Al(OSiMe$_3$), (iso-Bu)$_2$Al(OSiEt$_3$), etc;

(iii) Compounds of the formula $R^a{}_nAl(OAlR^d{}_2)_{3-n}$ such as Et$_2$AlOAlEt$_2$, (iso-Bu)$_2$AlOAl(iso-Bu)$_2$, etc;

(iv) Compounds of the formula $R^a{}_nAl(NR^e{}_2)_{3-n}$ such as Me$_2$AlNEt$_2$, Et$_2$AlNHMe, Me$_2$AlNHEt; Et$_2$AlN(Me$_3$Si)$_2$, (iso-Bu)$_2$AlN(Me$_3$Si)$_2$, etc;

(v) Compounds of the formula $R^a{}_nAl(SiR^f{}_3)_{3-n}$ such as (iso-Bu)$_2$AlSiMe$_3$, etc; and (vi) Compounds of the formula $R^a{}_nAl[N(R^g)-AlR^h{}_2]_{3-n}$ such as Et$_2$AlN(Me)-AlEt$_2$, (iso-Bu)$_2$AlN(Et)Al(iso-Bu)$_2$, etc.

Of the organoaluminum compounds (B-1) as exemplified above, preferred are those of the formula $R^a{}_3Al$, $R^a{}_nAl(OR^b)_{3-n}$ or $R^a{}_nAl(OAlR^d{}_2)_{3-n}$.

The alkyl complex compound composed of a metal in Group I of a periodic table and aluminum can be exemplified by a compound represented by the following formula:

$$M^1AlR^j{}_4$$

wherein $M^1$ is Li, Na or K, and $R^j$ is a hydrocarbon group of 1-15 carbon atoms.

Concrete examples of the alkyl complex compounds include LiAl(C$_2$H$_5$)$_4$ and LiAl(C$_7$H$_{15}$)$_4$.

The organometallic compound of a metal in Group II of a periodic table can be exemplified by a compound represented by the following formula:

$$R_1R_2M_2$$

wherein each of $R_1$ and $R_2$ is a hydrocarbon group of 1-15 carbon atoms or a halogen, $R_1$ and $R_2$ may be the same or different from each other but excluding a case where both of them are halogens, and $M_2$ is Mg, Zn or Cd.

Concrete examples thereof include diethylzinc, diethylmagnesium, butylethylmagnesium, ethylmagnesium chloride and butylmagnesium chloride.

These compounds may be employed in combination of two or more kinds.

Examples of useful electron donor catalyst component (C) used in the present invention are the electron donor mentioned above and an organosilicon compound represented by the following formula:

$$R_nSi(OR')_{4-n}$$

wherein each of R and R' is a hydrocarbon group, and n is a number satisfying the condition of $0<n<4$.

Concrete examples of the organosilicon compounds represented by the above formula include:
trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilane, n-butyltriethoxysilane, isobutyltriethoxysilane, phenyltriethoxysilane, γ-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, methyltriallyoxysilane, vinyltris(β-methoxyethoxysilane), vinyltriacetoxysilane, dimethyltetraethoxysilane, cyclopentyltrimethoxysilane, 2-methylcyclopentyltrimethoxysilane, 2,3-dimethylcyclopentyltrimethoxysilane, cyclopentyltriethoxysilane, dicyclopentyldimethoxysilane, bis (2-methylcyclopentyl)dimethoxysilane, bis(2,3-dimethylcyclopentyl)dimethoxysilane, dicyclopentyldiethoxysilane, tricyclopentylmethoxysilane, tricyclopentylethoxysilane, dicyclopentylmethylmethoxysilane, dicyclopentylethylmethoxysilane, hexenyltrimethoxysilane, dicyclopentylmethylethoxysilane, cyclopentyldimethylmethoxysilane, cyclopentyldiethylmethoxysilane, and cyclopentyldimethylethoxysilane.

Of these, preferably used are ethyltriethoxysilane, n-propyltriethoxysilane, t-butyltriethoxysilane, vinyltriethoxysilane, phenyltriethoxysilane, vinyltributoxysilane, diphenyldimethoxysilane, phenylmethyldimethoxysilane, bis-p-tolyldimethoxysilane, p-tolylmethyldimethoxysilane, dicyclohexyldimethoxysilane, cyclohexylmethyldimethoxysilane, 2-norbornanetriethoxysilane, 2-norbornanemethyldimethoxysilane, phenyltriethoxysilane, dicyclopentyldimethoxysilane, hexenyltrimethoxysilane, cyclopentyltriethoxysilane, tricyclopentylmethoxysilane and cyclopentyldimethylmethoxysilane.

The catalyst for olefin polymerization employable in the invention comprises the above-mentioned solid titanium catalyst component (A-1), organometallic compound catalyst component (B) and electron donor catalyst component (C), and in the invention, higher α-olefin is copolymerized with α, ω-diene and non-conjugated diene using this catalyst for olefin polymerization. It is also possible to prepolymerize α-olefin or higher α-olefin using this catalyst for olefin polymerization and then polymerize higher α-olefin with α, ω-diene and non-conjugated diene using this catalyst for olefin polymerization. In the prepolymerization, α-olefin or higher α-olefin is prepolymerized in an amount of 0.1 to 500 g, preferably 0.3 to 300 g, particularly preferably 1 to 100 g, based on 1 g of the catalyst for olefin polymerization.

The catalyst concentration in the reaction system for the prepolymerization may be much higher than that in the reaction system for the polymerization.

The amount of the solid titanium catalyst component (A-1) in the prepolymerization is generally in the range of about 0.01 to 200 mmol, preferably about 0.1 to 100 mmol, more preferably 1 to 50 mmol, in terms of titanium atom, based on 1 liter of the later-described inert hydrocarbon medium.

The organometallic compound catalyst component (B) is used such an amount that a polymer would be produced in an amount of 0.1 to 500 g, preferably 0.3 to 300 g, per 1 g of the solid titanium catalyst component (A-1). In concrete, the amount of the organometallic compound catalyst component (B) is generally in the range of about 0.1 to 100 mol, preferably about 0.5 to 50 mol, more preferably 1 to 20 mol, based on 1 mol of the titanium atom contained in the solid titanium catalyst component (A-1).

The electron donor catalyst component (C) is used in an amount of generally 0.1 to 50 mol, preferably 0.5 to 30 mol, more preferably 1 to 10 mol, based on 1 mol of the titanium atom contained in the solid titanium catalyst component (A-1).

The prepolymerization is carried out preferably under mild conditions by adding olefin or higher α-olefin and the catalyst for olefin polymerization to an inert hydrocarbon medium.

Concrete examples of the inert hydrocarbon medium used herein include aliphatic hydrocarbons such as propane, butane, pentane, hexane, heptane, octane, decane, dodecane and kerosine; alicyclic hydrocarbons such as cyclopentane, cyclohexane and methylcyclopentane; aromatic hydrocarbons such as benzene, toluene and xylene; halogenated hydrocarbons such as ethylene chloride and chlorobenzene; and mixtures of these hydrocarbons. Of these inert hydrocarbon media, aliphatic hydrocarbons are particularly preferably employed. Olefin or higher α-olefin itself may be prepolymerized in a solvent or may be prepolymerized in a state where a solvent does not substantially exist.

The higher α-olefin used in the prepolymerization may be the same or different from the higher α-olefin used in the later-described polymerization.

The reaction temperature in the prepolymerization is usually in the range of about $-20°$ to $+100°$ C., preferably about $-20°$ to $+80°$ C., more preferably $0°$ to $+40°$ C.

A molecular weight regulator such as hydrogen can be used in the prepolymerization. The molecular weight regulator is desirably used in such an amount that a polymer obtained by the prepolymerization would have an intrinsic viscosity ($\eta$), as measured in decalin at $135°$ C., of not less than about 0.2 dl/g, preferably in the range of about 0.5 to 10 dl/g.

The prepolymerization can be carried out either batchwise or continuously.

In the presence of a catalyst for olefin polymerization comprising the solid titanium catalyst component (A-1) (or the solid titanium catalyst component (A-1) obtained by the prepolymerization on a catalyst for olefin polymerization as described above), the organoaluminum compound catalyst component (B) and the electron donor catalyst component (C), copolymerization (polymerization) of the higher α-olefin, the α, ω-diene and the non-conjugated diene is carried out.

When the copolymerization is carried out after the prepolymerization, a component similar to the organometallic compound catalyst component (B) used for preparing the catalyst for olefin polymerization may be used as an organometallic compound catalyst compound, in addition to the prepolymerized catalyst. Further, when the copolymerization is carried out after the prepolymerization, a component similar to the electron donor catalyst component (C) used for preparing the catalyst for olefin polymerization may be used in the copolymerization as an electron donor catalyst component. The organoaluminum compound and the electron donor employable in the copolymerization of the higher α-olefin, the α, ω-diene and the non-conjugated diene are not always the same as those used for preparing the above-mentioned catalyst for olefin polymerization.

The copolymerization of the higher α-olefin, the α, ω-diene and the non-conjugated diene is generally carried out in a liquid phase.

As the reaction medium (diluent), the aforementioned inert hydrocarbon medium may be used, or an olefin which is liquid at a reaction temperature may be used.

In the copolymerization of the higher α-olefin, the α, ω-diene and the non-conjugated diene, the solid titanium catalyst component (A−1) is used generally in an amount of about 0.001 to about 1.0 mmol, preferably about 0.005 to 0.5 mmol, in terms of titanium atom, based on 1 liter of the polymerization volume. The organometallic compound catalyst component (B) is used generally in such an amount that the metal atom contained in the organoaluminum compound catalyst component would be generally in the range of about 1 to 2,000 mol, preferably about 5 to 500 mol, based on 1 mol of the titanium atom contained in the solid titanium catalyst component (A—1). The electron donor catalyst component (C) is used generally in an amount of about 0.001 to 10 mol, preferably 0.01 to 2 mol, more preferably 0.05 to 1 mol, based on 1 mol of the metal atom contained in the organometallic compound catalyst component (B).

In this copolymerization, hydrogen may be used to regulate the molecular weight of the resulting copolymer.

The temperature for the polymerization of the higher α-olefin, the α, ω-diene and the non-conjugated diene in the invention is usually in the range of about 20° to 200° C., preferably about 40° to 100° C. and the pressure therefor is usually in the range of an atmospheric pressure to 100 kg/cm², preferably an atmospheric pressure to 50 kg/cm². The copolymerization of the higher α-olefin, the α, ω-diene and the non-conjugated diene may be carried out either batchwise, semi-continuously or continuously. Further, the copolymerization may be carried out in two or more steps having reaction conditions different from each other.

RUBBER (2)

The vulcanizable rubber composition of the invention comprises the above-mentioned higher α-olefin copolymer (1) and a rubber (2). This rubber (2) is at least one selected from the group consisting of a diene rubber, an ethylene/α-olefin copolymer, a nitrile rubber and a hydrogenated nitrile rubber.

Diene rubber

The diene rubber used in the invention includes conventionally known ones: concretely natural rubber, isoprene rubber, SBR and Br, but does not include NBR.

As the natural rubber referred to above, there are used generally those classified according to Greek Book (international quality and package standard for various grades of natural rubber).

As the isoprene rubber mentioned above, there are used generally those having a specific gravity of 0.91–0.94 and a Mooney viscosity [$ML_{1+4}$ (100° C.)] of 30–120.

As SBR described above, there may be used generally those having a specific gravity of 0.91–0.98 and a Mooney viscosity [$ML_{1+4}$ (100° C.)] of 20–120.

Further, as BR mentioned above, there may be used generally those having a specific gravity of 0.90–0.95 and a Mooney viscosity [$ML_{1+4}$ (100° C.)] of 20–120.

In the invention, these diene rubbers may be used either alone or as a mixture of two or more.

Of the above-mentioned diene rubbers, preferably used are natural rubber, isoprene rubber, SBR, BR or a mixture thereof.

Ethylene/α-olefin Copolymer

The ethylene/α-olefin copolymer used in the present invention is composed basically of ethylene and α-olefin, and may further contain a polyene component.

The (α-olefin contained in the above-mentioned copolymer has 3-6 carbon atoms, and includes, for example, propylene, 1-butene, 1-pentene, 4-methyl-1-pentene and 1-hexene. Of these, preferred are propylene and 1-butene.

The molar ratio of ethylene to α-olefin (ethylene/α-olefin) in the ethylene/α-olefin copolymer used in the invention is 50/50–95/5, preferably 55/45–93/7, and especially 60/40–91/9.

The polyene component which may be used is a non-conjugated polyene, including 1,4-hexadiene, 5-ethylidene-2-norbornene, 5-vinyl-2-norbornene, 5-isopropenyl-2-norbornene and dicyclopentadiene, and above all preferred are 5-ethylidene-2-norbornene and dicyclopentadiene.

The amount of the non-conjugated polyene component contained in the ethylene/α-olefin copolymer is in terms of iodine value, 1–50, preferably 4–40, and especially 6–30, and, in terms of mol %, 0.1–10, preferably 0.5–7, and especially 1–5.

The ethylene/α-olefin copolymer used in the invention has an intrinsic viscosity ($\eta$), as measured in decalin at 135° C., of 0.8–5 dl/g, preferably 0.9–4 dl/g, and especially 1.0–3 dl/g. If the intrinsic viscosity ($\eta$), exceeds 5 dl/g, it is difficult to process the resulting rubber composition. On the other hand, if the intrinsic viscosity ($\eta$) is less than 0.8 dl/g, the resultant rubber composition tends to the deterioration of strength characteristics.

The vulcanizable rubber composition of the invention has high strength characteristics. The reason therefor is considered to be ascribable to a long molecular chain length of the ethylene/α-olefin copolymer contained in the composition.

Nitrile rubber or hydrogenated nitrile rubber

The nitrile rubber used in the invention is a copolymer consisting essentially of butadiene and acrylonitrile, including nitrile rubber having an acrylonitrile content of 10–40% by weight and a Mooney viscosity [$ML_{1+4}$ (100° C.)] of 20–100.

The hydrogenated nitrile rubber used in the invention is a rubber obtained by hydrogenation of a nitrile rubber, for example, those as mentioned above, including a hydrogenated nitrile rubber having an iodine value of 2–40.

MIXING RATIO OF HIGHER OLEFIN COPOLYMER (1) TO RUBBER (2)

The weight ratio ((1)/(2)) of the higher α-olefin copolymer (1) to the rubber (2) in the vulcanizable rubber composition of the invention is 5/95–95/5, preferably 90–90/10 and especially 20/80–80/20.

When the vulcanizable rubber composition of the invention is used for a tire sidewall as mentioned later, a diene rubber is used as the rubber (2), wherein the weight ratio ((1)/(2)) of the higher α-olefin copolymer rubber (1) to the diene rubber (2) is 5/95–50/50, preferably 10/90–40/60, and especially 10/90–30/70.

Other components

The rubber composition of the invention may further contain, for example, rubber reinforcing agents such as finely divided silicic acid, carbon black such as SRF, GPF, FEF, HAF, ISAF, SAF, FT and MT, and fillers such as precipitated calcium carbonate, ground calcium carbonate, talc, clay and silica. Though the kind and amount of the rubber reinforcing agent and filler may appropriately selected according to the purpose for which the rubber composition is used, they are used usually in an amount of at most 300 parts by weight, preferably at most 200 parts by weight, based on 100 parts by weight of sum total amount of the higher α-olefin copolymer (1) and the rubber (2).

Though the rubber composition of the invention may be used in the state it is not vulcanized, it exhibits the most excellent characteristics when it is used in the form of vulcanized products. That is, the higher α-olefin copolymer (1) contained in the rubber composition of the invention has a function of improving the vulcanized product in characteristics such as damping properties and dynamic fatigue resistance, and the rubber (2) also has a function of improving the vulcanized product in characteristics such as strength, and hence it is possible to obtain from the rubber compositions of the invention vulcanized products excellent in strength characteristics, damping properties and dynamic fatigue resistance and also excellent in adhesive properties to fiber.

In preparing vulcanized products from the rubber composition of the invention, there may suitably be selected, according to the use and performance of the vulcanized product intended, the kind and amount of rubber reinforcing agents, fillers and softening agents, in addition to the higher α-olefin copolymer (1) and the rubber (2), the kind and amount of compounds in a vulcanization system such as vulcanizing agents, vulcanizing accelerators and vulcanizing aids, and the kind and amount of antiaging agents and processing aids, and the process for preparing the vulcanized products.

As the filler, there may be used precipitated calcium carbonate, ground calcium carbonate, talc, clay and silica. In addition, there may also be used tackifiers, waxes, binding resins, zinc oxide, antioxidants, ozone crack inhibitors.

When the vulcanizable rubber composition of the invention is used for a tire tread as mentioned later, a preferred amount of the reinforcing agent is 30-150 parts by weight, particularly 40-100 parts by weight. In general, when the amount of the reinforcing agent is larger, the resultant tire tread tends to deteriorate in rolling resistance, though it improves in damping performance (wet skid) on a wet road surface. On the other hand, when the amount of the reinforcing agent is smaller, the resultant tire tread tends to deteriorate in abrasion resistance.

The sum total amount of the higher α-olefin copolymer (1) and the rubber (2) in the vulcanized product may appropriately selected according to the performance and use of the vulcanized product intended, and is usually not less than 20% by weight, preferably not less than 25% by weight.

As the softening agent, there may be used those usually used in rubber, including, for example, petroleum softeners such as process oil, lubricant oil, paraffin, liquid paraffin, petroleum asphalt and vaseline; coal tar softeners such as coal tar and coal tar pitch; fatty oil softeners such as castor oil, linseed oil, rapeseed oil and coconut oil; tall oil; factice; waxes such as beeswax, carnauba wax and lanolin; fatty acids and esters thereof such as ricinolic acid, palmitic acid, barium stearate, calcium stearate and zinc laurate; and synthetic high molecular substances such as petroleum resin, atactic polypropylene and coumarone-indene resin. Of these softening agents, preferably used are petroleum softeners, particularly process oil. The amount of these softening agents may appropriately be selected according to the use of the vulcanized product intended, and is at most 150 parts by weight, preferably at most 100 parts by weight, based on 100 parts by weight of sum total amount of the higher α-olefin copolymer (1) and the rubber (2).

To produce vulcanized products from the rubber composition of the invention, an unvulcanized rubber composition is first prepared as in the conventional manner, and the rubber composition thus prepared is then formed into a desired shape, followed by vulcanization.

The vulcanization of the rubber composition may be performed by either heating the rubber composition in the presence of a vulcanizing agent or irradiating the composition with electron beam.

The vulcanizing agent used includes sulfur compounds and organic peroxides. The rubber composition of the invention exhibits the most favorable characteristics, particularly when the sulfur compounds are used.

The sulfur compounds include sulfur, sulfur chloride, sulfur dichloride, morpholine disulfide, alkyl phenol disulfide, tetramethylthiuram disulfide and selenium dimethyldithiocarbamate. Of these compounds, preferably used is sulfur. The sulfur compound is used in an amount of 0.1-10 parts by weight, preferably 0.5-5 parts by weight, based on 100 parts by weight of sum total amount of the higher α-olefin copolymer (1) and the rubber (2).

When the sulfur compounds are used as the vulcanizing agents, it is preferable to use a vulcanizing accelerator in combination therewith. The vulcanizing accelerators include thiazole compounds such as N-cyclohexyl-2-benzothiazole sulfenamide, N-oxydiethylene-2-benzothiazole sulfeneamide, N,N-diisopropyl-2-benzothiazole sulfenamide, 2-mercaptobenzothiazole, 2-(2,4-dinitrophenol)mercaptobenzothiazole, 2-(2,6-diethyl-4-morpholinothio)benzothiazole and dibenzothiazyl disulfide;

guanidine compounds such as diphenylguanidine, triphenylguanidine, diorthonitrile guanidine, orthonitrile biguanide and diphenylguanidine phthalate;

aldehydeamine or aldehyde-ammonia compounds such as acetaldehyde-aniline reaction product, butylaldehyde-aniline condensate, hexamethylenetetramine and acetaldehyde ammonia;

imidazoline compounds such as 2-mercaptoimidazoline;

thiourea compounds such as thiocarbanilide, diethylthiourea, dibutylthiourea, trimethylthiourea and diorthotolylthiourea;

thiuram compounds such as tetramethylthiuram monosulfide, tetramethylthiuram disulfide, tetraethylthiuram disulfide, tetrabutylthiuram disulfide and pentamethylenethiuram tetrasulfide;

dithiocarbamate compounds such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium -dimethyldithiocarbamate;

xanthate compounds such as zinc xanthogenate; and zinc white.

These vulcanizing accelerators may be used in an amount of 0.1-20 parts by weight, preferably 0.2-10 parts by weight, based on 100 parts by weight of sum total amount of the higher α-olefin copolymer (1) and the rubber (2).

The organic peroxides may be those usually used in the vulcanization of rubber with peroxide. Such organic peroxides include, for example, dicumyl peroxide, di-t- butyl peroxide, di-t-butylperoxy-3,3,5-trimethylcyclohexane, t-butylhydroperoxide, t-butylcumyl peroxide, benzoylperoxide, 2,5-dimethyl-2,5-di(t-butylperoxy)hexine-3, 2,5-dimethyl-2,5-di(benzoylperoxy)hexane, 2,5-dimethyl-2,5-mono(t-butylperoxy)hexane and $\alpha,\alpha'$-bis(t-butylperoxy-m-isopropyl)benzene. Of these organic peroxides, preferably used are dicumyl peroxide, di-t-butyl peroxide and di-t-butylperoxy-3,3,5-trimethylcyclohexane. These organic peroxides may be used either alone or in combination, and in an amount of 0.0003–0.05 mole, preferably 0.001–0.03 mole based on 100 g of the higher $\alpha$-olefin copolymer. However, it is desirable to decide suitably the optimum amount of the peroxide or peroxides used according to the values of physical properties required for the vulcanized product as aimed at.

When the organic peroxide is used as the vulcanizing agent, it is preferable to use a vulcanizing aid in combination therewith. The vulcanizing aids include sulfur; quinodioxime compounds such as p-quinodioxim; methacrylate compounds such as polyethylene glycol dimethacrylate; allyl compounds such as diallylphthalate and triallyl cyanurate; maleimide compounds; and divinylbenzene. The vulcanizing aids are used in an amount of 0.5–2 moles, preferably about equimolar amount, based on 1 mole of the organic peroxide used.

When the shaped unvulcanized rubber compound, which will be mentioned later, is vulcanized by the use of electron beam without using a vulcanizing agent, the rubber compound may be irradiated with electron having an energy of 0.1–10 MeV (megaelectron volt), preferably 0.3–2 MeV so that the absorbed dose becomes 0.5–35 Mrad (megarad), preferably 0.5–10 Mrad.

The unvulcanized rubber compound is prepared, for example, by the following procedures. That is, in a mixer such as a Banbury mixer, the higher $\alpha$-olefin copolymer (1), the rubber (2), the filler and softening agent are kneaded at a temperature of 80°–170° C. for 3–10 minutes. Thereafter, by means of rolls such as an open roll mill, the resulting kneaded product is incorporated with a vulcanizing agent and, if necessary, a vulcanizing accelerator or vulcanizing aid, the mixture is further kneaded at a roll temperature of 40°–80° C. for 5–30 minutes, and the kneaded product is dispensed to prepare a ribbon-like or sheet-like rubber compound.

In the case where natural rubber is used as the rubber (2), if the natural rubber is masticated in advance, its compatibility with the rubber reinforcing agent and filler can be improved.

The thus prepared unvulcanized rubber compound may be formed into a desired shape by means of an extruder, calendering roll or press, and the thus shaped product is vulcanized in a vulcanizing bath by heating at a temperature of 150°–270° C. for 1–30 minutes or by irradiating with electron beam in the manner mentioned above to obtain a vulcanized product. It is also possible to perform the formation of the shaped product and the vulcanization thereof simultaneously. The vulcanizing step may be carried out with or without using a mold. When the mold is not used, the steps of formation and vulcanization of the rubber compound are performed usually in a continuous manner. In the heating bath, the unvulcanized shaped rubber compound is heated by means of a heated air, glass bead fluidized bed, UHF (ultrahigh frequency) and steam. When the vulcanization of a compound is carried out by irradiating electron beam, the rubber compound used may be free from a vulcanizing agent.

It is desirable that a vulcanization activator is added to the vulcanization system in the second stage of vulcanization.

The thus prepared vulcanized rubber products are excellent in workability, strength characteristics, weatherability, ozone resistance and dynamic fatigue resistance and also in adhesive properties to fiber.

Use

Vulcanized products obtained from the vulcanizable rubber compositions of the present invention have effects as mentioned above, and have wide applications in parts for automotive industry, such as tires, rubber vibration insulators and covering materials for vibrating components, industrial rubber articles, such as rubber covered rolls and belts, electrical insulating materials, civil engineering and construction components, rubber coated fabrics or the like. In particular, the vulcanized products mentioned above can be used in articles of manufacture for which dynamic fatigue resistance is required, for example, tire sidewalls, tire treads, rubber vibration insulators, rubber rolls, belts, wiper blades and various packings.

Especially, the vulcanized products of the vulcanizable rubber compositions containing a diene rubber as the rubber (2) are useful as the tire sidewalls and tire treads.

Vulcanized products of the vulcanizable rubber compositions containing an ethylene/$\alpha$-olefin copolymer as the rubber (2) are widely used for the purposes, e.g., automotive parts such as rubber vibration insulators, tires and covering materials for vibrating components, industrial rubber articles, such as rubber rolls and belts, electrical insulating materials, civil engineering and construction components, rubber coated fabrics and the like. In particular, the vulcanized products just mentioned above can suitably be used in articles of manufacture for which vibration damping properties and dynamic fatigue resistance are required, for example,-rubber vibration insulators, rubber rolls, belts tires and wiper blades. Further, a foamed rubber prepared from this vulcanizable rubber compositions may be used as heat insulators, cushioning materials and sealing materials.

Furthermore, the vulcanized products of the vulcanizable rubber compositions containing a nitrile rubber and/or hydrogenated nitrile rubber as the rubber (2) have wide applications in automotive parts, general industrial parts, civil engineering and construction components or the like. In particular, the vulcanized products just mentioned above can suitably be used in articles of manufacture for which oil resistance and dynamic fatigue resistance are required, for example, parts around the automobile engine, rubber vibration insulators, rubber rolls, belts, wiper blades, various packings or the like.

The present invention is illustrated below with reference to examples, but it should be construed that the invention is in no way limited to those examples.

EXAMPLE 1

Preparation of solid titanium catalyst component (A)

A mixture of 95.2 g anhydrous magnesium chloride, 442 ml of decane and 390.6 g of 2-ethylhexyl alcohol was heated at 130° C. for 2 hours, thereby obtaining a homogeneous solution. To this solution was added 21.3 g of phthalic anhydride, and the mixture was stirred at 130° C. for 1 hour to dissolve the phthalic anhydride in the homogeneous solution, and then cooled to room temperature. 75 ml of the thus cooled homogeneous solution was dropwise added over a period of 1 hour to 200 ml of titanium tetrachloride kept at −20° C. After completion of the addition, the temperature of this mixture was elevated to 110° C. over a period of 4 hours. When the temperature reached 110° C., 5.22 g of diisobutyl phthalate was added to the mixture, and then the mixture was stirred at that temperature for 2 hours. After the 2-hour reaction period, the reaction mixture was filtered while hot to collect a solid portion, and the solid portion was suspended in 275 ml of titanium tetrachloride, followed by heating at 110° C. for 2 hours. After the completion of the reaction, the suspension was filtered again while hot to collect a solid substance which was then washed sufficiently with decane and hexane at 110° C. until any free titanium compounds are not detected in the washings. The titanium catalyst component (A) prepared by the above operation was stored as a decane slurry. A part of this slurry was dried and subjected to determine the catalyst composition, and the thus obtained solid titanium catalyst component (A) was composed of 2.5% by weight of titanium, 65% by weight of chlorine, 19% by weight of magnesium and 13.5% by weight of diisobutyl phthalate.

Polymerization

In a 4-liter glass polymerization vessel equipped with a stirring blade, octene-1, 1,5-hexadiene and 7-methyl-1,6-octadiene was continuously copolymerized.

To the polymerization vessel were fed continuously from the upper portion thereof a hexane solution of octene-1, 1,5-hexadiene and 7-methyl-1,6-octadiene at a rate of 2.1l/hr so that in the polymerization vessel the concentrations of octene-1, 1,5-hexadiene and 7-methyl-1,6-octadiene become 200 g/l, 39 g/l and 10 g/l, respectively, a hexane slurry solution of a solid titanium catalyst component (A) at a rate of 0.4 l/hr so that in the polymerization vessel the concentration of titanium becomes 0.045 mmol/l, a hexane solution of triisobutyl aluminum at a rate of 1 l/hr so that in the polymerization vessel the concentration of aluminum becomes 8 mmol/l, and a hexane solution of trimethylmethoxysilane at a rate of 0.5 l/hr so that in the polymerization vessel the concentration of silane becomes 2.6 mmol/l. On the other hand, the resultant polymer solution was continuously drawn out from the lower portion of the polymerization vessel so that the volume of the polymer solution in the polymerization vessel constantly becomes 2 liters. Further, from the upper portion of the polymerization vessel, hydrogen at a rate of 1 liter/hr and nitrogen at a rate of 50 liter/hr were charged. The copolymerization reaction was carried out at 50° C. maintained by circulating hot water through a jacket fitted to the outside of the polymerization vessel.

Subsequently, the copolymerization reaction was terminated by the addition of small amounts of methanol to the polymer solution drawn out from the lower portion of the polymerization vessel, and this polymer solution was poured into large amounts of methanol to precipitate a copolymer. The copolymer was sufficiently washed with methanol, and dried at 140° C. overnight under a reduced pressure, to obtain an octene-1/1,5-hexadiene/7-methyl-1,6-octadiene copolymer (1-a) at a rate of 90 g/hr.

The copolymer (1-a) had a molar ratio of octene-1 to 1,5-hexadiene (octene-1/1,5-hexadiene) of 68/32, an iodine value of 7.7, and an intrinsic viscosity $(\eta)$, as measured in decalin at 135° C., of 4.8 dl/g.

A hexene-1/1,5-hexadiene/7-methyl-1,6-octadiene copolymer (1-b) and a decene-1/1,6-heptadiene/7-methyl-1,6-octadiene copolymer (1-c) were prepared in substantially the same procedure as described above except for changing the higher α-olefin and the polymerization conditions to those set forth in Table 1.

The conditions of the above-mentioned copolymerization are shown in Table 1.

TABLE 1

|  | Copolymer 1-a | Copolymer 1-b | Copolymer 1-c |
| --- | --- | --- | --- |
| Ti Concn. [mmol/l] | 0.04 | 0.04 | 0.04 |
| Al Concn. [mmol/l] | 8.0 | 6.0 | 8.0 |
| Third component | TMMS | TMES | TMMS |
| [mmol/l] | 2.6 | 2.0 | 2.6 |
| Hydrogen [l/hr] | 1 | 1 | 1 |
| Nitrogen [l/hr] | 50 | 50 | 50 |
| Higher α-olefin | Octene-1 | Hexene-1 | Decene-1 |
| [g/l] | 200 | 162 | 178 |
| α, ω-Diene [g/l] | HexD | HexD | HepD |
|  | 39 | 35 | 33 |
| MOD [g/l] | 10 | 8 | 9 |
| Copolymerization reaction temperature [°C.] | 50 | 50 | 50 |
| Copolymer yield [g/hr] | 90 | 140 | 200 |
| Copolymer |  |  |  |
| Higher α-olefin/ α, ω-diene [molar ratio] | 68/32 | 79/21 | 73/27 |
| MOD [mol %] | 3.1 | 2.5 | 3.6 |
| $(\eta)$ (dl/g) | 4.8 | 5.3 | 4.9 |

Al: Triisobutyl aluminum
TMMS: Trimethylmethoxysilane
TMES: Trimethylethoxysilane
MOD: 7-Methyl-1,6-octadiene
HexD: 1,5-hexadiene
HepD: 1,6-heptadiene Production of vulcanized rubber product The octene-1/1,5-hexadiene/7-methyl-1,6-octadiene copolymer (1-a) as the higher α-olefin copolymer (1) and a commercially available natural rubber RSS1 (Malaysian product) (2-a) used as the diene rubber (2) were formulated in an amount set forth in Table 2 to obtain an unvulcanized rubber mixture.

The natural rubber was first masticated, according to the usual way, by means of an open roll mill adjusted to 40° C. so as to have a Mooney viscosity [$ML_{1+4}$ (100° C.)] of 60. Then, the copolymer (1-a), the masticated natural rubber (2-a), zinc white, stearic acid, HAF carbon and naphthenic oil were kneaded for 4 minutes by means of a 4.3-liter Banbury mixer (produced and sold by Kobe Seikosho K.K.), and the resultant kneaded product was allowed to stand for 1 day at room temperature.

To the thus obtained kneaded product, vulcanizing accelerators (DPG and CBZ) and sulfur were added and kneaded by means of an open roll mill (front roll-/back roll: 50°/60° C., 16/18 rpm), to thereby obtain a rubber composition.

TABLE 2

| Composition | Amount [part(s) by weight] |
| --- | --- |
| Copolymer (1-a) | 30 |
| Natural rubber (2-a) | 70 |
| Stearic acid | 1 |
| Zinc white | 5 |
| HAF carbon 1) | 50 |
| Naphthenic oil 2) | 5 |

TABLE 2-continued

| Composition | Amount [part(s) by weight] |
| --- | --- |
| Sulfur | 2.2 |
| Vulcanizing accelerator DPG 3) | 1 |
| Vulcanizing accelerator CBZ 4) | 0.5 |

Note:
1) Trade name: Shiest H, manufactured by Tokai Carbon K.K.
2) Trade name: Sanceler 4240, manufactured by Nippon Sun Sekiyu K.K.
3) Trade name: Sanceler D, manufactured by Sanshin Kagaku Kogyo K.K.
4) Trade name: Sanceler CM, manufactured by Sanshin Kagaku Kogyo K.K.

The thus obtained rubber composition was heated for 20 minutes by means of a press heated at 160° C. to produce a vulcanized sheet which was then subjected to the following test. The test items are as follows.

Test item

Tensile test, hardness test, ozone resistance test, flex test and test on adhesion of the vulcanized sheet to a polyester cord.

Test method

The tensile test, hardness test, ozone resistance test and flexural test were measured in accordance with JIS K 6301.

The tensile strength ($T_B$) and elongation ($E_B$) were measured in the tensile strength test, and JIS A hardness ($H_S$) was measured in the hardness test.

The ozone resistance test (a static test) was conducted in an ozone chamber under the conditions of an ozone concentration of 50 pphm, an elongation of 20%, a test temperature of 40° C. and a test time of 200 hours. The ozone resistance was evaluated by observing the surface deterioration (surface profile) of the vulcanized sheet after the test. The standard for evaluating the surface profile is as described below, and the evaluation result is expressed as, for example, "C-5".

Number of crack:
A . . . A little
B . . . Many
C . . . Innumerable
(where A,B and C indicate that the degree of the ozone resistance is decreasing in this order.)

Length and depth of cracks:
1. . . Cracks cannot be observed by the naked eye, but can be observed under a magnifying glass of 10 magnifications.
2. . . Cracks can be observed by the naked eye.
3. . . Deep cracks having a length of under 1 mm.
4. . . Deep cracks having a length of from 1 mm to 3 mm.
5. . . Cracks having a length of 3 mm or more and being about to break In the flexural test, the resistance to crack growth was examined by means of a de Mattia machine. That is, the number of times of flexes was measured until the length of a crack reached 15 mm, and the measurement result was taken as an indication of the dynamic fatigue resistance.

The test on adhesion of the vulcanized sheet to the polyester cord was carried out using a specimen prepared in accordance with the adhesion test method as described in Japanese Patent L-O-P Publn. No. 13779/1983. H adhesive force was measured according to ASTM D 2138 and obtained in terms of adhesive force per 10 mm of the thickness of the sheet from which the cord is pulled out.

The results obtained are shown in Table 3.

EXAMPLE 2

Example 1 was repeated except that the amounts of the copolymer (1-a) and natural rubber (2-a) were changed to 50 parts by weight and 50 parts by weight, respectively, to obtain a rubber composition.

The physical properties of the thus obtained rubber composition were determined, and the results are shown in Table 3.

EXAMPLE 3

Example 1 was repeated except that the amounts of the copolymer (1-a) and the natural rubber (2-a) were changed to 70 parts by weight and 30 parts by weight, respectively, to obtain a rubber composition.

The physical properties of the thus obtained rubber composition were determined, and the results are shown in Table 3.

COMPARATIVE EXAMPLE 1

Example 1 was repeated except that 100 parts by weight of the natural rubber (2-a) was used alone without using the copolymer (1-a), to obtain a rubber composition.

The physical properties of the thus obtained rubber composition were determined, and the results are shown in Table 3.

COMPARATIVE EXAMPLE 2

Example 1 was repeated except that 100 parts by weight of the copolymer (1-a) was used alone without using the natural rubber (2-a), to obtain a rubber composition.

The physical properties of the thus obtained rubber composition were determined, and the results are shown in Table 3.

COMPARATIVE EXAMPLE 3

Example 2 was repeated except that an ethylene/propylene/5-ethylidene-2-norbornene copolymer (EPDM) having an ethylene content of 70 mol %, an intrinsic viscosity ($\eta$), as measured in decalin at 135° C., of 2.5 dl/g, and an iodine value of 20 was used instead of the copolymer (1-a), to obtain a rubber composition.

The physical properties of the thus obtained rubber composition were determined, and the results are shown in Table 3.

EXAMPLE 4

Example 1 was repeated except that an SBR (2-b) (trade name: Nipol 1502, manufactured by Nippon Zeon Co., Ltd.) was used instead of the natural rubber (2-a), to obtain a rubber composition.

The physical properties of the thus obtained rubber composition were determined, and the results are shown in Table 3.

COMPARATIVE EXAMPLE 4

Example 4 was repeated except that 100 parts by weight of the SBR (2-b) was used alone without using the copolymer (1-a), to obtain a rubber composition.

The physical properties of the thus obtained rubber composition were determined, and the results are shown in Table 3.

EXAMPLE 5

Example 1 was repeated except that an isoprene rubber (2-c) (trade name: Nipol IR 2200, manufactured by Nippon Zeon Co., Ltd.) was used instead of the natural rubber (2-a), to obtain a rubber composition.

The physical properties of the thus obtained rubber composition were determined, and the results are shown in Table 3.

COMPARATIVE EXAMPLE 5

Example 5 was repeated except that 100 parts by weight of the isoprene rubber (2-c) was used alone without using the copolymer (1-a), to obtain a rubber composition.

The physical properties of the thus obtained rubber composition were determined, and the results are shown in Table 3.

EXAMPLE 6

Example 1 was repeated except that a BR (2-d) (trade name: Nipol BR 1220, manufactured by Nippon Zeon Co., Ltd.) was used instead of the natural rubber (2-a), to obtain a rubber composition.

The physical properties of the thus obtained rubber composition were determined, and the results are shown in Table 3.

COMPARATIVE EXAMPLE 6

Example 6 was repeated except that 100 parts by weight of the BR (2-d) was used alone without using the copolymer (1-a), to obtain a rubber composition.

The physical properties of the thus obtained rubber composition were determined, and the results are shown in Table 3.

EXAMPLE 7

Example 1 was repeated except that the hexene-1/1,5-hexadiene/7-methyl-1,6-octadiene copolymer (1-b) prepared in Example 1 was used instead of the copolymer (1-a), to obtain a rubber composition.

The physical properties of the thus obtained rubber composition were determined, and the results are shown in Table 3.

EXAMPLE 8

Example 1 was repeated except that a decene-1/1,6-heptadiene/7-methyl-1,6-octadiene copolymer (1-c) prepared in Example 1 was used instead of the copolymer (1-a), to obtain a rubber composition.

The physical properties of the thus obtained rubber composition were determined, and the results are shown in Table 3.

EXAMPLE 9

Example 1 was repeated except that a mixture rubber of 50 parts by weight of the natural rubber (2-a) and 20 parts by weight of the SBR (2-b) was used instead of 70 parts by weight of the natural rubber (2-a), to obtain a rubber composition.

The physical properties of the thus obtained rubber composition were determined, and the results are shown in Table 3.

EXAMPLE 10

Example 1 was repeated except that a mixture rubber of 50 parts by weight of the natural rubber (2-a) and 20 parts by weight of the BR (2-d) was used instead of 70 parts by weight of the natural rubber (2-a), to obtain a rubber composition.

The physical properties of the thus obtained rubber composition were determined, and the results are shown in Table 3.

TABLE 3

| | Ex.1 | Ex. 2 | Ex. 3 | Comp. Ex. 1 | Comp. Ex. 2 | Comp. Ex. 3 | Ex. 4 | Comp. Ex. 4 |
|---|---|---|---|---|---|---|---|---|
| Formulation: | | | | | | | | |
| Higher α-olefin copolymer (1) | 1-a | 1-a | 1-a | — | 1-a | EDPM | 1-a | — |
| Diene rubber (2) | 2-a | 2-a | 2-a | 2-a | — | 2-a | 2-b | 2-b |
| Physical properties: | | | | | | | | |
| $T_B$ [kg/cm$^2$] | 198 | 165 | 149 | 248 | 121 | 165 | 212 | 256 |
| $E_B$ [%] | 400 | 420 | 410 | 440 | 560 | 410 | 460 | 460 |
| $H_S$ | 55 | 53 | 51 | 59 | 49 | 66 | 55 | 60 |
| Ozone resistance (surface profile) | No crack | No crack | No crack | Broken | No crack | No crack | No crack | C-5 |
| Flexural fatigue resistance (No. of times to crack growth) | >10$^5$ | >10$^5$ | >10$^5$ | >10$^5$ | >10$^5$ | 3 × 10$^3$ | >10$^5$ | 2 × 10$^4$ |
| H adhesive force [kg/cm] | 19.1 | 18.3 | 17.9 | 20.1 | 17.2 | 5.1 | 19.5 | 20.7 |

| | Ex. 5 | Comp. Ex. 5 | Ex. 6 | Comp. Ex. 6 | Ex. 7 | Ex. 8 | Ex. 9 | Ex. 10 |
|---|---|---|---|---|---|---|---|---|
| Formulation: | | | | | | | | |
| Higher α-olefin copolymer (1) | 1-a | — | 1-a | — | 1-b | 1-c | 1-a | 1-a |
| Diene rubber (2) | 2-c | 2-c | 2-d | 2-d | 2-a | 2-a | 2-a + 2-b | 2-a + 2-d |
| Physical properties: | | | | | | | | |
| $T_B$ [kg/cm$^2$] | 184 | 228 | 196 | 240 | 218 | 185 | 202 | 195 |
| $E_B$ [%] | 440 | 440 | 460 | 450 | 480 | 430 | 460 | 430 |
| $H_S$ | 54 | 57 | 53 | 57 | 55 | 51 | 54 | 52 |
| Ozone resistance (surface profile) | No crack | Broken | No crack | Broken | No crack | No crack | No crack | No crack |
| Flexural fatigue resistance (No. of times to crack growth) | >10$^5$ | >10$^5$ | >10$^5$ | >10$^5$ | >10$^5$ | >10$^5$ | >10$^5$ | >10$^5$ |
| H adhesive force [kg/cm] | 17.8 | 18.5 | 17.3 | 17.8 | 17.5 | 17.0 | 19.1 | 18.2 |

Hereinafter, the rubber compositions comprising the higher α-olefin copolymer rubber (1) and the diene rubber (2) used as a rubber composition for a tire sidewall are explained.

In these cases, the properties of the rubber compositions are determined as follows:

The ozone resistance test (weatherability test) was conducted in accordance with JIS K 6301. That is, using the dumbbell specimen of No. 1 type having a thickness of 3 mm, the test was conducted in an ozone chamber under the conditions of an ozone concentration of 50 pphm, an elongation 25% at 100 rpm, and a test time of 48 hours. The evaluation is conducted in the same manner as in Example 1.

The adhesion properties were determined in the peel test, where a part of the surface of one specimen and a part of the surface of the other specimen were co-curing, and then the both specimens were peeled off. The test sample was a strip specimen of 1 inch width.

After the peel test the appearance of the specimens was observed, and "interfacial peeling" is expressed as D, and "breakage of specimen substrate" as E, the adhesive force E being stronger than D.

EXAMPLES 11 TO 15, COMPARATIVE EXAMPLES 7 AND 8 AND REFERENCE EXAMPLES 1 AND 2

Production of vulcanized rubber products

Using the higher α-olefin copolymer rubbers of (1-a), (1-b) and (1-c) prepared in Example 1, the rubber compositions were formulated in an amount set forth in Table 4. Then, the resultant compositions were kneaded with an 8-inch open roll mill and vulcanized at 150° C. for 20 minutes, to thereby obtain vulcanized products. The physical properties of the thus obtained vulcanized products were examined, and the results are shown in Table 4.

rubber (2) used as a rubber composition for a tire tread are explained.

In these Examples, the properties of the rubber composition are determined as follows:

The strength characteristics were evaluated by a tensile strength ($T_B$) which was measured in accordance with JIS K 6301.

The abrasion resistance was measured by means of a Lambourn abrasion tester (Iwamoto Seisakusho K.K.), under the conditions of a load of 3 kg, a circumferential velocity of the sample of 150 m/min, a circumferential velocity of a whetstone of 100 m/min.

The damping performance on a wet road surface (wet skid) 5 was measured in terms of tan δ at 0° C. by means of a dynamic spectrometer (Rheometric Co., Ltd.) under the conditions of a shear strain ratio of 0.5% and a frequency of 15 Hz.

The rolling resistance was measured in terms of tan δ at 50° C. by means of a dynamic spectrometer (Rheometric Co., Ltd.) under the conditions of a shear strain ratio of 0.5% and a frequency of 15 Hz.

EXAMPLES 16 TO 21; COMPARATIVE EXAMPLE 9 AND REFERENCE EXAMPLE 3

Production of vulcanized rubber products

Using the higher a-olefin copolymer rubbers of (1-a), (1-b) and (1-c) prepared in Example 1, the rubber compositions were formulated in an amount set forth in Table 5. Then, the resultant compositions were kneaded with an 8-inch open roll mill and vulcanized at 150° C. for 20 minutes, to thereby obtain vulcanized product.

The physical properties of the thus obtained vulcanized rubbers were examined, and the results are shown in Table 5.

TABLE 4

| | Ex. 11 | Ex. 12 | Ex. 13 | Ex. 14 | Ex. 15 | Comp. Ex. 7 | Comp. Ex. 8 | Refer. Ex. 1 | Refer. Ex. 2 |
|---|---|---|---|---|---|---|---|---|---|
| Proportion of rubber composition: (part(s) by weight) | | | | | | | | | |
| Higher α-olefin copolymer (1) | | | | | | | | | |
| 1-a | 25 | — | — | 15 | 40 | — | — | 1 | 70 |
| 1-b | — | 25 | — | — | — | — | — | — | — |
| 1-c | — | — | 25 | — | — | — | — | — | — |
| Dien rubber (2) | | | | | | | | | |
| NR[1] | 75 | 75 | 75 | 85 | 60 | 75 | 75 | 99 | 30 |
| BR[2] | — | — | — | — | — | 25 | — | — | — |
| Other rubber EPT[3] | — | — | — | — | — | — | 25 | — | — |
| Carbon black[4] | 50 | 50 | 50 | 50 | 50 | 50 | 50 | 50 | 50 |
| Oil | 5 | 5 | 5 | 5 | 5 | 5 | 5 | 5 | 5 |
| Stearic acid | 2 | 2 | 2 | 2 | 2 | 2 | 2 | 2 | 2 |
| Zinc white | 5 | 5 | 5 | 5 | 5 | 5 | 5 | 5 | 5 |
| Wax | 5 | 5 | 5 | 5 | 5 | 5 | 5 | 5 | 5 |
| Sulfur | 1.75 | 1.75 | 1.75 | 1.75 | 1.75 | 1.75 | 1.75 | 1.75 | 1.75 |
| Vulcanizing accelerator NOBS[5] | 1.0 | 1.0 | 1.0 | 1.0 | 1.0 | 1.0 | 1.0 | 1.0 | 1.0 |
| Physical properties: | | | | | | | | | |
| $T_B$ [kg/cm$^2$] | 220 | 223 | 208 | 230 | 180 | 220 | 228 | 252 | 167 |
| $E_B$ [%] | 540 | 550 | 520 | 540 | 530 | 520 | 530 | 550 | 510 |
| Ozone resistance (Surface profile) | No crack | No crack | No crack | A | No crack | C | A | C | No crack |
| Flexural fatigue resistance (No. of times to crack growth) | >10$^5$ | >10$^5$ | >10$^5$ | >10$^5$ | >10$^5$ | 1.2 × 10$^4$ | 2.0 × 10$^3$ | 3.0 × 10$^4$ | >10$^5$ |
| Adhesive properties | E | E | E | E | E | E | D | E | D |

Note:
[1] RSS #3
[2] Trade name: Nipol 1220 manufactured by Nippon Zeon Co., Ltd.
[3] Ethylene/propylene/5-ethylidene-2-norbornene copolymer having a moler ratio of ethylene to propylene of 65/35, intrinsic viscosity (η) as measured in decalin at 135° C. of 2.5 dl/g and an iodine value of 15.
[4] Trade name: FEF #60 manufactured by Asahi Carbon K.K.
[5] N-oxydiethylene-2-benzothiazole sulfeneamide Hereinafter, the rubber compositions comprising the higher α-olefin copolymer rubber (1) and the diene in Table 5.

TABLE 5

|  | Ex. 16 | Ex. 17 | Ex. 18 | Ex. 19 | Ex. 20 | Ex. 21 | Comp. Ex. 9 | Ref. Ex. 3 |
|---|---|---|---|---|---|---|---|---|
| Proportion of rubber composition (part(s) by Wt.): | | | | | | | | |
| Higher α-olefin copolymer (1) | | | | | | | | |
| 1-a | 10 | — | — | 5 | 20 | 10 | — | 60 |
| 1-b | — | 10 | — | — | — | — | — | — |
| 1-c | — | — | 10 | — | — | — | — | — |
| Diene rubber | | | | | | | | |
| NR[1] | 90 | 90 | 90 | 95 | 80 | 55 | 100 | 40 |
| SBR[2] | — | — | — | — | — | 35 | — | — |
| Carbon black[3] | 50 | 50 | 50 | 50 | 50 | 50 | 50 | 50 |
| Stearic acid | 2 | 2 | 2 | 2 | 2 | 2 | 2 | 2 |
| Zinc white | 5 | 5 | 5 | 5 | 5 | 5 | 5 | 5 |
| Sulfur | 1.5 | 1.5 | 1.5 | 1.5 | 1.5 | 1.5 | 1.5 | 1.5 |
| Vulcanizing accelerator NS[4] | 1.5 | 1.5 | 1.5 | 1.5 | 1.5 | 1.5 | 1.5 | 1.5 |
| Physical properties: | | | | | | | | |
| $T_B$ [kg/cm$^2$] | 198 | 207 | 191 | 210 | 190 | 215 | 224 | 178 |
| Lambourn abrasion [cc/min] | 0.060 | 0.051 | 0.066 | 0.051 | 0.070 | 0.052 | 0.049 | 0.083 |
| Damping performance tan δ (0° C.) | 0.27 | 0.28 | 0.25 | 0.23 | 0.33 | 0.27 | 0.21 | 0.41 |
| Rolling resistance tan δ (50° C.) | 0.12 | 0.13 | 0.12 | 0.15 | 0.11 | 0.12 | 0.18 | 0.22 |

Note:
[1] RSS #3
[2] Trade name: Nipol 1502 manufactured by Nippon Zeon Co., Ltd.
[3] Trade name: Asahi #75 manufactured by Asahi Carbon K.K.
[4] N-t-butyl-2-benzothiazole sulfeneamide manufactured by Ouchi Shinko Kagaku Kogyo K.K.

EXAMPLE 22

Production of vulcanized rubber products

The octene-1/1,5-hexadiene/7-methyl-1,6-octadiene copolymer (1-a) prepared in Example 1 as the higher α-olefin copolymer (1), and ethylene/propylene/5-ethylidene-2-norbornene copolymer (2-a) (having a molar ratio of ethylene to propylene of 70/30, an intrinsic viscosity (η), as measured in decalin at 135° C., of 2.5 dl/g, and an iodine value of 15) as the ethylene/α-olefin copolymer (2) were formulated in an amount set forth in Table 6 to obtain an unvulcanized rubber.

In the above procedure, the α-olefin copolymer (1-a), the ethylene/α-olefin copolymer (2-a), zinc white, stearic acid, FEF carbon and naphthenic oil were kneaded for 6 minutes by means of 4.3-litter Banbury mixer (Kobe Seikosho K.K.), and the resultant kneaded product was allowed to stand for 1 day at room temperature. To the thus obtained kneaded product, the vulcanizing accelerators and sulfur were added, and kneaded by means of an open roll mill (front roll/back roll; 50/60° C., 16/18 rpm), to thereby obtain a rubber composition.

TABLE 6

| Composition | Amount (part(s) by weight) |
|---|---|
| Higher α-olefin copolymer (1) | 50 |
| Ethylene/α-olefin copolymer (2) | 50 |
| Stearic acid | 1 |
| Zinc white | 5 |
| FEF carbon 1) | 50 |
| Napthenic oil 2) | 10 |
| Sulfur | 1 |
| Vulcanizing accelerator 3) | 0.5 |
| Vulcanizing accelerator 4) | 1.5 |

Note:
1) Trade name: Shiest SO manufactured by Tokai Carbon K.K.
2) Trade name: Sunthene 4240 manufactured by Nippon Sun Sekiyu K.K.
3) Trade name: Sanceler M manufactured by Sanshin Kogaku Kogyo K.K.
4) Trade name: Sanceler TT manufactured by Sanshin Kogaku Kogyo The thus obtained rubber composition was heated for 30 minutes by means of a press heated to 150° C. to prepare a vulcanized sheet. The vulcanized sheet was subjected to the following tests. The test items are as follows:

Test items

Tensile test, hardness test, aging test, flexural test and damping properties test.

Test method

The tensile test, hardness test, aging test and flexural test were conducted in accordance with JIS K 6301.

The aging test was conducted by heating the vulcanized sheet with hot air of 120° C. for 70 hours, and the retentions of physical properties of the vulcanized product before aging, namely, retention of tensile strength $A_R$ ($T_B$) and retention of elongation $A_R$ ($E_B$) were measured.

The flexural test was conducted in the same manner as in Example 1.

The damping properties were determined by measuring a loss tan δ at 25° C. and 100 rad/sec by means of a dynamic spectrometer (Rheometric Co., Ltd.) as an indication of the damping properties.

The results are shown in Table 7.

EXAMPLE 23

Example 22 was repeated except that the amounts of the copolymer (1-a) and the copolymer (2-a) were changed to 80 parts by weight and 20 parts by weight, respectively, to obtain a rubber composition.

The physical properties of the thus obtained rubber composition were determined, and the results are shown in Table 7.

EXAMPLE 24

Example 22 was repeated except that the amounts of the copolymer (1-a) and the copolymer (2-a) were changed to 20 parts by weight and 80 parts by weight, respectively, to obtain a rubber composition.

The physical properties of the thus obtained rubber composition were determined, and the results are shown in Table 7.

COMPARATIVE EXAMPLE 10

Example 22 was repeated except that 100 parts by weight of the copolymer (1-a) was used alone without using the copolymer (2-a), to obtain a rubber composition.

The physical properties of the thus obtained rubber composition were determined, and the results are shown in Table 7.

COMPARATIVE EXAMPLE 11

Example 22 was repeated except that 100 parts by weight of the copolymer (2-a) was used alone without using the copolymer (1-a), to obtain a rubber composition.

The physical properties of the thus obtained rubber composition were determined, and the results are shown in Table 7.

EXAMPLE 25

Example 22 was repeated except that the hexene-1/1,5-hexadiene/7-methyl-1,6-ocatadiene copolymer (1-b) prepared in Example 1 was used instead of the copolymer (1-a), to obtain a rubber composition.

The physical properties of the thus obtained rubber composition were determined, and the results are shown in Table 7.

EXAMPLE 26

Example 22 was repeated except that the decene-1/1,6-heptadiene/7-methyl-1,6-octadiene copolymer (1-c) prepared in Example 1 was used instead of the copolymer (1-a), to obtain a rubber composition.

The physical properties of the thus obtained rubber composition were determined, and the results are shown in Table 7.

EXAMPLE 27

Example 22 was repeated except that the ethylene/1-butene/5-ethylidene-2-norbornene copolymer (2-b) (having a molar ratio of ethylene to 1-butene of 90/10, an intrinsic viscosity ([1]), as measured in decalin at 135° C., of 2.8 dl/g, and an iodine value of 10) was used instead of the copolymer (2-a), to obtain a rubber composition.

The physical properties of the thus obtained rubber composition were determined, and the results are shown in Table 7.

EXAMPLE 28

Production of vulcanized rubber products

The octene-1/1,5-hexadiene/7-methyl-1,6-octadiene copolymer (1-a) prepared in Example 1 as the higher α-olefin copolymer (1) and a commercially available Nipol 1042 (2-a) (manufactured by Nippon Zeon Co., Ltd.) as a nitrile rubber and/or a hydrogenated nitrile rubber (2) were formulated in an amount set forth in Table 8 to obtain an unvulcanized rubber composition.

In the above procedure, the α-olefin copolymer (1-a), the Nipol 1042 (2-a), zinc white, stearic acid, HAF carbon dioctyl phthalate were kneaded for 4 minutes by means of 4.3-litter Banbury mixer (Kobe Seikosho K.K.), and the resultant kneaded product was allowed to stand for 1 day at room temperature. To the thus obtained kneaded product, the vulcanizing accelerators (DPG and CBZ) and sulfur were added and kneaded by means of an open roll mill (front roll/back roll: 50°/60° C., 16/18 rpm), to thereby obtain a rubber composition.

TABLE 8

| Composition | Amount (part(s) by weight) |
| --- | --- |
| Copolymer (1-a) | 30 |
| Nitrile rubber (2-a) | 70 |
| Stearic acid | 1 |
| Zinc white | 5 |
| HAF carbon 1) | 50 |
| Dioctyl phthalate | 5 |
| Sulfur | 2.2 |
| Vulcanizing accelerator 2) | 1 |
| Vulcanizing accelerator 3) | 0.5 |

Note:
1) Trade name: Shiest H manufactured by Tokai Carbon K.K.
2) Trade name: Sanceler D manufactured by Sanshin Kagaku Kogyo K.K.
3) Trade name: Sanceler CM manufactured by Sanshin Kagaku Kogyo K.K.

The thus obtained rubber composition was heated for 30 minutes by means of a press heated to 150° C. to prepare a vulcanized sheet. The vulcanized sheet was subjected to the following tests. The test items are as follows:

Test items

Tensile test, hardness test, ozone resistance test, low-temperature properties, flexural test and test on adhesion of the vulcanized sheet to a polyester cord.

Test method

The tensile test, hardness test, ozone resistance test, low-temperature properties and flexural test were conducted in accordance with JIS K 6301.

TABLE 7

| | Ex. 22 | Ex. 23 | Ex. 24 | Comp. Ex. 10 | Comp. Ex. 11 | Ex. 25 | Ex. 26 | Ex. 27 |
| --- | --- | --- | --- | --- | --- | --- | --- | --- |
| Formulation: | | | | | | | | |
| Higher α-olefin copolymer (1) | 1-a | 1-a | 1-a | 1-a | — | 1-b | 1-c | 1-a |
| Ethylene/α-olefin copolymer (2) | 2-a | 2-a | 2-a | — | 2-a | 2-a | 2-a | 2-b |
| Physical properties: | | | | | | | | |
| $T_B$ [kg/cm$^2$] | 112 | 102 | 147 | 92 | 179 | 145 | 106 | 195 |
| $E_B$ [%] | 450 | 510 | 560 | 510 | 590 | 500 | 530 | 580 |
| $H_S$ | 54 | 50 | 57 | 47 | 61 | 55 | 53 | 68 |
| $A_R$ ($T_B$) [%] | 90 | 92 | 97 | 98 | 82 | 90 | 89 | 92 |
| $A_R$ ($E_B$) [%] | 77 | 78 | 76 | 82 | 75 | 80 | 83 | 88 |
| Flexural fatigue resistance (No. of times to crack growth) | >10$^5$ | >10$^5$ | 3 × 10$^4$ | >10$^5$ | <10$^3$ | >10$^5$ | >10$^5$ | >10$^5$ |
| Loss tangent (tan δ) | 0.36 | 0.52 | 0.20 | 0.62 | 0.10 | 0.47 | 0.28 | 0.37 |

The ozone resistance test, flexural test and test on adhesion of the vulcanized sheet to a polyester cord were conducted in the same manner as in Example 1.

The low-temperature properties were determined by measuring a brittleness temperature (BT). 0 The results are shown in Table 9.

EXAMPLE 29

Example 28 was repeated except that the amounts of the copolymer (1-a) and the nitrile rubber (2-a) were changed to 50 parts by eight and 50 parts by weight, respectively, to obtain a rubber composition.

The physical properties of the thus obtained rubber composition were determined, and the results are shown in Table 9.

EXAMPLE 30

Example 28 was repeated except that the amounts of the copolymer (1-a) and the nitrile rubber (2-a) were changed to 70 parts by weight and 30 parts by weight, respectively, to obtain a rubber composition.

The physical properties of the thus obtained rubber composition were determined, and the results are shown in Table 9.

COMPARATIVE EXAMPLE 12

Example 28 was repeated except that 100 parts by weight of the nitrile rubber (2-a) was used alone without using the copolymer (1-a), to obtain a rubber composition.

The physical properties of the thus obtained rubber composition were determined, and the results are shown in Table 9.

COMPARATIVE EXAMPLE 13

Example 28 was repeated except that 100 parts by weight of the copolymer (1-a) was used alone without using the nitrile rubber (2-a), to obtain a rubber composition.

The physical properties of the thus obtained rubber composition were determined, and the results are shown in Table 9.

COMPARATIVE EXAMPLE 14

Example 29 was repeated except that an ethylene/-propylene/5-ethylidene-2-norbornene copolymer (EPDM) (having an ethylene content of 70 mol %, an intrinsic viscosity ($\eta$), as measured in decalin at 135° C. of 2 5 dl/g, and an iodine value of 20) was used instead of the copolymer (1-a), to obtain a rubber composition.

The physical properties of the thus obtained rubber composition were determined, and the results are shown in Table 9.

EXAMPLE 31

Example 28 was repeated except that a hydrogenated nitrile rubber (2-b) (trade name: Zetpol 2020, manufactured by Nippon Zeon Co., Ltd.) was used instead of the nitrile rubber (2-a), to obtain a rubber composition.

The physical properties of the thus obtained rubber composition were determined, and the results are shown in Table 9.

COMPARATIVE EXAMPLE 15

Example 31 was repeated except that 100 parts by weight of the hydrogenated nitrile rubber (2-b) was used alone without using the copolymer (1-a), to obtain a rubber composition.

The physical properties of the thus obtained rubber composition were determined, and the results are shown in Table 9.

EXAMPLE 32

Example 28 was repeated except that a hexene-1/1,5-hexadiene/7-methyl-1,6-octadiene copolymer (1-b) prepared in Example 1 was used instead of the copolymer (1-a), to obtain a rubber composition.

The physical properties of the thus obtained rubber composition were determined, and the results are shown in Table 9.

EXAMPLE 33

Example 28 was repeated except that a decene-1/1,6-heptadiene/7-methyl-1,6-octadiene copolymer (1-c) prepared in Example 1 was used instead of the copolymer (1-a), to obtain a rubber composition.

The physical properties of the thus obtained rubber composition were determined, and the results are shown in Table 9.

EXAMPLE 34

Example 28 was repeated except that a mixture rubber of 50 parts by weight of the nitrile rubber (2-a) and 20 parts by weight of the hydrogenated nitrile rubber (2-b) was used instead of 70 parts by weight of the nitrile rubber (2-a), to obtain a rubber composition.

The physical properties of the thus obtained rubber composition were determined, and the results are shown in Table 9.

TABLE 9

| | Ex. 28 | Ex. 29 | Ex. 30 | Comp. Ex. 12 | Comp. Ex. 13 | Comp. Ex. 14 | Ex. 31 | Comp. Ex. 15 | Ex. 32 | Ex. 33 | Ex. 34 |
| --- | --- | --- | --- | --- | --- | --- | --- | --- | --- | --- | --- |
| Formulation: | | | | | | | | | | | |
| Higher α-olefin copolymer (1) | 1-a | 1-a | 1-a | — | 1-a | EPDM | 1-a | — | 1-b | 1-c | 1-a |
| Nitrile rubber and/or hydrogenated nitrile rubber (2) | 2-a | 2-a | 2-a | 2-a | — | 2-a | 2-b | 2-b | 2-a | 2-a | 2-a + 2-b |
| Physical properties: | | | | | | | | | | | |
| $T_B$ [kg/cm$^2$] | 172 | 131 | 114 | 248 | 101 | 165 | 151 | 250 | 185 | 160 | 171 |
| $E_B$ [%] | 420 | 420 | 450 | 440 | 510 | 410 | 410 | 460 | 440 | 400 | 420 |
| $H_S$ | 63 | 59 | 54 | 71 | 49 | 69 | 64 | 72 | 64 | 60 | 63 |
| Ozone resistance (surface profile) | No crack | No crack | No crack | broken | No crack | No crack | No crack | A-1 | No crack | No crack | No crack |

TABLE 9-continued

| | Ex. 28 | Ex. 29 | Ex. 30 | Comp. Ex. 12 | Comp. Ex. 13 | Comp. Ex. 14 | Ex. 31 | Comp. Ex. 15 | Ex. 32 | Ex. 33 | Ex. 34 |
|---|---|---|---|---|---|---|---|---|---|---|---|
| Brittleness temperature (°C.) | −55 | −49 | −43 | −35 | −65 | −44 | −53 | −32 | −52 | −52 | −53 |
| Flexural fatigue resistance (No. of times to crack growth) | >$10^5$ | >$10^5$ | >$10^5$ | $2 \times 10^3$ | >$10^5$ | $3 \times 10^3$ | >$10^5$ | $2 \times 10^3$ | >$10^5$ | >$10^5$ | >$10^5$ |
| H adhesive force [kg/cm] | 19.5 | 18.5 | 16.3 | 25.1 | 15.9 | 5.1 | 17.9 | 24.5 | 20.5 | 16.1 | 18.5 |

What is claimed is:

1. A vulcanizable rubber composition comprising:
a higher α-olefin (1) consisting of a higher α-olefin having 6–20 carbon atoms, and an α,ω-diene represented by the following general formula (I)

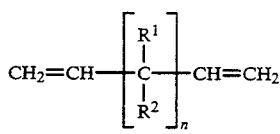

wherein n is an integer of 1–3, and $R^1$ and $R^2$ each represent independently a hydrogen atom or an alkyl group of 1–8 carbon atoms, and a non-conjugated diene represented by the following general formula (II)

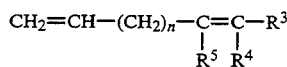

wherein n is an integer of 1–5, $R^3$ represents an alkyl group of 1–4 carbon atoms, and $R^4$ and $R^5$ each represent a hydrogen atom or an alkyl group of 1–8 carbon atoms, provided that both $R^4$ and $R^5$ are not hydrogen atoms simultaneously, and
at least one rubber (2) selected from the group consisting of an ethylene/α-olefin copolymer rubber, a nitrile rubber and a hydrogenated nitrile rubber, which composition has a weight ratio ((1)/(2)) of said higher α-olefin copolymer (1) to said rubber (2) in the range of from 5/95 to 95/5.

2. The rubber composition as claimed in claim 1 wherein the higher Cα-olefin copolymer (1) has a molar ratio of the higher α-olefin to the α, ω-diene (higher α-olefin/α, ω-diene) in the range of from 95/5 to 50/50.

3. The rubber composition as claimed in claim 1 wherein an intrinsic viscosity (η) of the higher α-olefin copolymer (1) as measured in decalin at 135° C. is in the range of 1.0–10.0 dl/g.

4. The rubber composition as claimed in claim 1 wherein an iodine value of the higher α-olefin copolymer (1) is 1–50.

5. The rubber composition as claimed in claim 1 wherein the constituent α-olefin of the ethylene/α-olefin copolymer (2) is propylene or 1-butene.

6. The rubber composition as claimed in claim 1 wherein an intrinsic viscosity (η) of the ethylene/α-olefin copolymer (2) as measured in decalin at 135° C. is in the range of 0.8–5.0 dl/g.

7. The rubber composition as claimed in claim 1 wherein the ethylene/α-olefin copolymer (2) contains 0.1–5 mol % of a non-conjugated polyene.

8. A vulcanizable rubber composition for a tire sidewall comprising:
a higher α-olefin (1) consisting of a higher α-olefin having 6–20 carbon atoms, and an α, ω-diene represented by the following general formula (I)

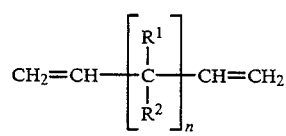

wherein n is an integer of 1–3, and $R^1$ and $R^2$ each represent independently a hydrogen atom or an alkyl group of 1–8 carbon atoms, and a non-conjugated diene represented by the following general formula (II)

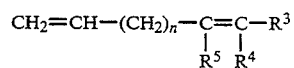

wherein n is an integer of 1–5, $R^3$ represents an alkyl group of 1–4 carbon atoms, and $R^4$ and $R^5$ each represent a hydrogen atom or an alkyl group of 1–8 carbon atoms, provided that both $R^4$ and $R^5$ are not hydrogen atoms simultaneously, and
a diene rubber (2) which is a member selected from the group consisting of a natural rubber, isoprene rubber, SBR, BR or a mixture thereof, which composition has a weight ratio ((1)/(2)) is in the range of from 5/95 to 50/50.

9. A vulcanizable rubber composition for a tire tread comprising:
a higher α-olefin (1) consisting of a higher α-olefin having 6–20 carbon atoms, and an α, ω-diene represented by the following general formula (I)

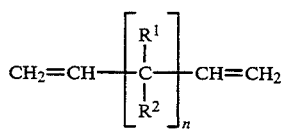

wherein n is an integer of 1–3, and $R^1$ and $R^2$ each represent independently a hydrogen atom or an alkyl group of 1–8 carbon atoms, and a non-conjugated diene represented by the following general formula (II)

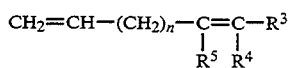

wherein n is an integer of 1–5, $R^3$ represents an alkyl group of 1–4 carbon atoms, and $R^4$ and $R^5$ each represent a hydrogen atom or an alkyl group of 1–8 carbon atoms, provided that both $R^4$ and $R^5$ are not hydrogen atoms simultaneously, and a diene rubber (2) which is a member selected from the group consisting of a natural rubber, isoprene rubber, SBR, BR or a mixture thereof, which composition has a weight ratio ((1)/(2)) is in the range of from 1/99 to 50/50.

10. A vulcanizable rubber composition comprising:

a higher α-olefin (1) consisting of a higher α-olefin having 6–20 carbon atoms, and an α, ω-diene represented by the following general formula (I)

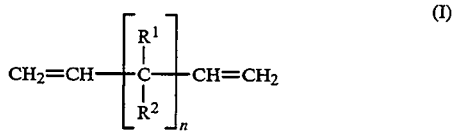
(I)

wherein n is an integer of 1–3, and $R^1$ and $R^2$ each represent independently a hydrogen atom or an alkyl group of 1–8 carbon atoms, and a non-conjugated diene represented by the following general formula (II)

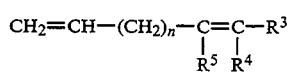
(II)

wherein n is an integer of 1–5, $R^3$ represents an alkyl group of 1–4 carbon atoms, and $R^4$ and $R^5$ each represent a hydrogen atom or an alkyl group of 1–8 carbon atoms, provided that both $R^4$ and $R^5$ are not hydrogen atoms simultaneously, and at least one diene rubber (2) which is a member selected from the group consisting of a natural rubber, isprene rubber, SBR, BR or a mixture thereof, which composition has a weight ratio ((1)/(2)) of said higher α-olefin copolymer (1) to said rubber (2) in the range of from 5/95 to 95/5.

11. The rubber composition as claimed in claim 10 wherein the higher α-olefin copolymer (1) has a molar ratio of the higher α-olefin to the α, ω-diene (higher α-olefin/α, ω-diene) in the range of from 95/5 to 50/50.

12. The rubber composition as claimed in claim 10 wherein an intrinsic viscosity (η) of the higher α-olefin copolymer (1) as measured in decalin at 135° C. is in the range of 1.0–10.0 dl/g.

13. The rubber composition as claimed in claim 10 wherein an iodine value of the higher α-olefin copolymer (1) is 1–50.

* * * * *